United States Patent
Chu et al.

(10) Patent No.: US 10,111,185 B2
(45) Date of Patent: Oct. 23, 2018

(54) BACKOFF OPERATION IN CONNECTION WITH SPATIAL REUSE

(71) Applicant: Marvell World Trade Ltd., St. Michael (BB)

(72) Inventors: Liwen Chu, San Ramon, CA (US); Lei Wang, San Diego, CA (US); Jinjing Jiang, San Jose, CA (US); Hongyuan Zhang, Fremont, CA (US); Yakun Sun, Sunnyvale, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 13 days.

(21) Appl. No.: 15/335,160

(22) Filed: Oct. 26, 2016

(65) Prior Publication Data

US 2017/0118725 A1 Apr. 27, 2017

Related U.S. Application Data

(60) Provisional application No. 62/246,445, filed on Oct. 26, 2015.

(51) Int. Cl.
*G08C 17/00* (2006.01)
*H04W 52/32* (2009.01)
(Continued)

(52) U.S. Cl.
CPC ....... *H04W 52/325* (2013.01); *H04W 52/367* (2013.01); *H04W 72/0446* (2013.01);
(Continued)

(58) Field of Classification Search
CPC . H04W 52/325; H04W 52/367; H04W 52/16; H04W 52/14; H04W 74/0473; H04W 74/0816
See application file for complete search history.

(56) References Cited

U.S. PATENT DOCUMENTS 9,178,593 B1 11/2015 Liu et al.
2014/0286203 A1* 9/2014 Jindal ................. H04J 11/0026
370/278
(Continued)

FOREIGN PATENT DOCUMENTS

WO WO 2015/147874 10/2015

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
(Continued)

*Primary Examiner* — Alvin Zhu

(57) ABSTRACT

A communication device receives a signal during a backoff period of a backoff procedure, wherein the communication device is part of a first communication network. In response to determining that i) the signal is valid, ii) the signal is from another communication network, and iii) the power level of the signal does not meet a threshold that is higher than a default threshold, the communication device continues a count of a backoff timer during reception of the signal. In connection with comparing the power level of the signal to the threshold higher than the default threshold, the communication device sets a transmit power level to a reduced power level that is lower than a default power level. The communication device transmits at a transmit power level that is less than or equal to the reduced transmit power level in response to the backoff timer expiring.

22 Claims, 10 Drawing Sheets

(51) Int. Cl.
  *H04W 72/04* (2009.01)
  *H04W 74/08* (2009.01)
  *H04W 52/36* (2009.01)
  *H04W 84/12* (2009.01)
  *H04W 16/14* (2009.01)
  *H04W 52/16* (2009.01)

(52) U.S. Cl.
  CPC ... *H04W 72/0473* (2013.01); *H04W 74/0816* (2013.01); *H04W 16/14* (2013.01); *H04W 52/16* (2013.01); *H04W 84/12* (2013.01)

(56) References Cited

U.S. PATENT DOCUMENTS

2014/0328270 A1   11/2014   Zhu et al.
2017/0105217 A1*   4/2017   Kwon ................. H04B 17/318

OTHER PUBLICATIONS

IEEE P802.11ah™/D5.0 "Draft Standard for Information Technology—Telecommunications and information exchange between systems Local and metropolitan area networks—Specific requirements, Part 11: Wireless LAN Medium Access Control (MAC) and Physical Layer (Phy) Specifications: Amendment 2: Sub 1 GHz License Exempt Operation," *The Institute of Electrical and Electronics Engineers, Inc.*, pp. 1-632 (Mar. 2015).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std P802.11-REVmc™/D8.0, (Revision of IEEE Std 802.11™-2012), "Draft Standard for Information Technology—Telecommunications and information exchange between systems—Local and metropolitan area networks—Specific requirements," Part 11: Wireless LAN Medium Access Control (MAC) and Physical Layer (PHY) Specifications, The Institute of Electrical and Electronics Engineers, Inc., 3775 pages (Aug. 2016).

Hiertz et al., "The IEEE 802.11 Universe," IEEE Communications Magazine, pp. 62-70, (Jan. 2010).

Seok et al., "Hew PPDU Format for Supporting MIMO-OFDMA," IEEE 802.11-14/1210r0, 16 pages, (Sep. 14, 2014).

U.S. Appl. No. 14/961,558, Chu et al., "Methods and Apparatus for Carrying Out Backoff Operations," filed Dec. 7, 2015.

U.S. Appl. No. 14/963,045, Chu et al., "Methods and Devices for Determining Channel State," filed Dec. 8, 2015.

U.S. Appl. No. 15/291,818, Jiang et al., "Methods and Apparatus for Interference Aware Spatial Reuse," filed Oct. 12, 2016.

International Search Report and Written Opinion in International Patent Application No. PCT/US2016/058883, dated Feb. 6, 2017 (16 pages).

Itagaki et al., "Dynamic CCA Control and TPC Simulation Results with SS1~SS3," *IEEE Draft*, IEEE 802.11-15/1045r0, 54 pages (Sep. 14, 2015).

International Preliminary Report on Patentability in International Patent Application No. PCT/US2016/058883, dated May 11, 2018 (11 pages).

* cited by examiner

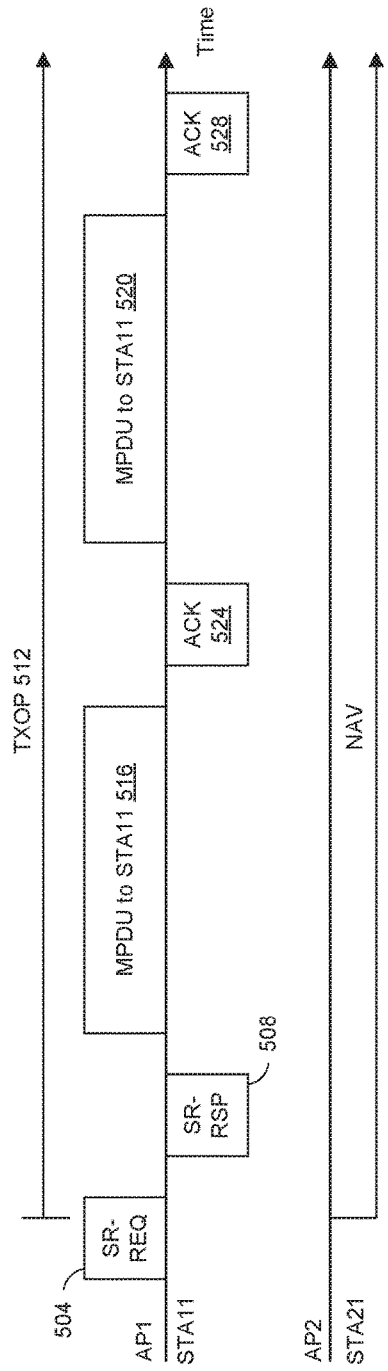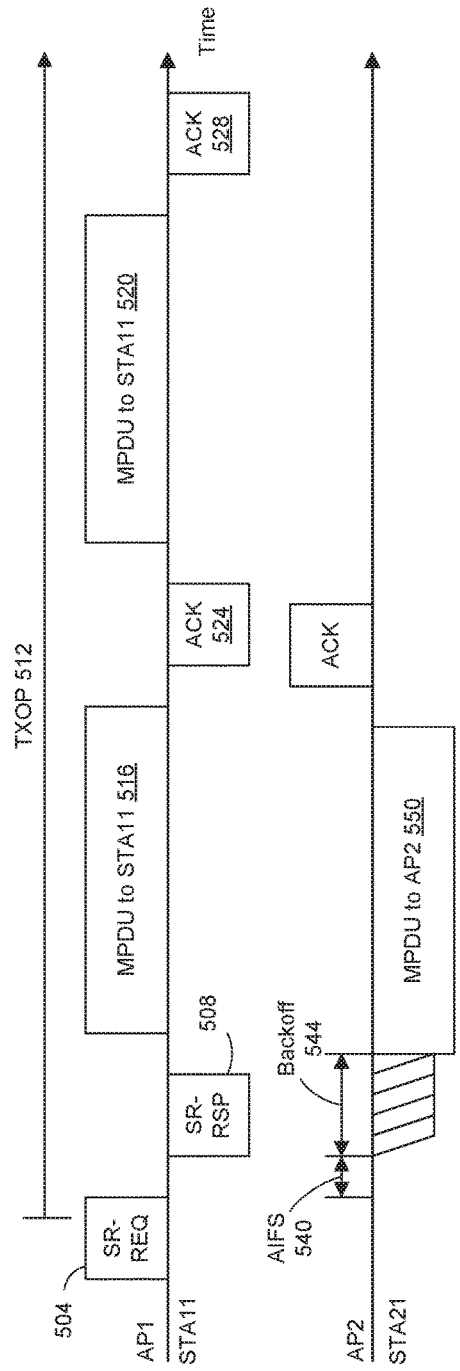

BACKOFF OPERATION IN CONNECTION WITH SPATIAL REUSE

CROSS-REFERENCE TO RELATED APPLICATION

This disclosure claims the benefit of U.S. Provisional Patent Application No. 62/246,445, filed Oct. 26, 2015, entitled "Dynamic CCA and Per TXOP Spatial Medium Sharing," the disclosure of which is hereby expressly incorporated herein by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

The Institute for Electrical and Electronics Engineers (IEEE) 802.11 family of Standards (generally "802.11") has gone through several iterations over the last decade. In some of the 802.11 standards, such as 802.11ah and beyond, the identity of the Basic Service Set (BSS) (e.g., as managed by an access point (AP) of the BSS) is indicated in a Physical Layer Convergence Procedure (PLCP) Protocol Data Unit (PPDU) by a set of bits that described the "color" of the BSS. The color of a BSS corresponds to an identifier (ID) of the BSS that is shorter than a BSS identifier (BSSID) defined by 802.11. The BSS color may be contained in the Physical Layer (PRY) Signal (SIG) field in a PRY header of a PPDU, whereas the BSSID is typically included in a media access control (MAC) portion of PPDUs. A device (e.g., an AP or client) in a BSS can determine whether a PPDU is from the BSS to which the device belongs (the "same-BSS") or some other BSS (e.g., an overlapping BSS (OBSS)) by decoding the SIG field and interpreting BSS color bits included therein.

One of the newer implementations of 802.11 being discussed is 802.11ax (sometimes referred to as 802.11 HE or 802.11 HEW). 802.11ax contemplates dynamically adjusting the energy level at which a channel is deemed to be clear depending on whether the energy corresponds to same-BSS signals or to signals from another BSS. Such a scheme helps to promote spatial reuse between neighboring networks.

SUMMARY

In an embodiment, a method includes: receiving, at a communication device, a signal during a backoff period of a backoff procedure, wherein the communication device is part of a first communication network; and performing, at the communication device, the backoff procedure, including: determining, at the communication device, whether i) the signal is valid, ii) the signal is from another communication network, and iii) a power level of the signal meets a threshold that a) is higher than a default threshold for the backoff procedure, and b) is for analyzing valid signals not from the first communication network, and in response to determining that i) the signal is valid, ii) the signal is from another communication network, and iii) the power level of the signal does not meet the threshold, continuing a count of a backoff timer, at the communication device, during reception of the signal, the backoff timer for measuring a backoff time period, and in connection with comparing the power level of the signal to the threshold that is higher than the default threshold, setting, at the communication device, a transmit power level to be used when the communication device transmits responsive to the backoff timer expiring to a reduced power level that is lower than a default power level. The method also includes causing the communication device to transmit at a transmit power level that is less than or equal to the reduced transmit power level in response to the backoff timer expiring as part of the backoff procedure.

In another embodiment, an apparatus comprises a network interface device associated with a communication device that is part of a first communication network. The network interface device has one or more integrated circuits configured to: receive a signal during a backoff period of a backoff procedure; and perform the backoff procedure, including: determining whether i) the signal is valid, ii) the signal is from another communication network, and iii) a power level of the signal meets a threshold that a) is higher than a default threshold for the backoff procedure, and b) is for analyzing valid signals not from the first communication network, in response to determining that i) the signal is valid, ii) the signal is from another communication network, and iii) the power level of the signal meets the threshold, continuing a count of a backoff timer, at the communication device, during reception of the signal, the backoff timer for measuring a backoff time period, and in connection with comparing the power level of the signal to the threshold that is higher than the default threshold, setting, at the communication device, a transmit power level to be used when the communication device transmits responsive to the backoff timer expiring to a reduced power level that is lower than a default power level. The one or more integrated circuits are further configured to: in response to the backoff timer expiring as part of the backoff procedure, cause the communication device to transmit at a transmit power level that is less than or equal to the reduced transmit power level.

In yet another embodiment, a method includes: transmitting, with a communication device in a communication network, a first control frame to request a transmit opportunity period (TXOP), wherein the first control frame includes spatial reuse parameters including a transmit power parameter indicating a reduced transmit power is to be used during the TXOP, and ii) a signal power threshold parameter indicating a raised signal power threshold is to be used during the TXOP, and wherein the first control frame is transmitted at a default power level greater than the reduced transmit power to be used during the TXOP; and during the TXOP, using, at the communication device, the raised signal power threshold to as part of a backoff procedure, and transmitting, with the communication device, one or more physical layer (PITY) data units at a transmit power that is less than or equal to the reduced transmit power.

In still another embodiment, an apparatus comprises a network interface device associated with a communication device that is part of a first communication network. The network interface device has one or more integrated circuits configured to: transmit a first control frame to request a transmit opportunity period (TXOP), wherein the first control frame includes spatial reuse parameters including a transmit power parameter indicating a reduced transmit power is to be used during the TXOP, and ii) a signal power threshold parameter indicating a raised signal power threshold is to be used during the TXOP, and wherein the first control frame is transmitted at a default power level greater than the reduced transmit power to be used during the TXOP. The one or more integrated circuits are also configured to, during the TXOP: use the raised signal power threshold to as part of a backoff procedure, and transmit one or more physical layer (PHY) data units at a transmit power that is less than or equal to the reduced transmit power.

In yet another embodiment, a method includes: receiving, at a communication device in a first communication network, a control frame transmitted in a second communication network and signaling a transmit opportunity period (TXOP) in the second communication network, wherein the control frame includes spatial reuse parameters comprising a transmit power parameter indicating a reduced transmit power is to be used during the TXOP; determining, at the communication device and using the transmit power parameter in the control frame, whether the communication device can transmit in the first communication network during the TXOP; and at least one of: i) when the communication device determines that the communication device can transmit in the first communication network during the TXOP, performing, at the communication device, a backoff procedure before transmitting any physical layer (PHY) data units in the first communication network during the TXOP, or ii) transmitting any PHY data units in the first communication network during the TXOP only when a network allocation vector (NAV) counter associated with a third communication network has expired.

In another embodiment, an apparatus comprises a network interface device associated with a communication device that is part of a first communication network. The network interface device has one or more integrated circuits configured to: receive a control frame transmitted in a second communication network and signaling a transmit opportunity period (TXOP) in the second communication network, wherein the control frame includes spatial reuse parameters comprising a transmit power parameter indicating a reduced transmit power is to be used during the TXOP; determine, using the transmit power parameter in the control frame, whether the communication device can transmit in the first communication network during the TXOP; and at least one of i) when the communication device determines that the communication device can transmit in the first communication network during the TXOP, perform a backoff procedure before transmitting any physical layer (PHY) data units in the first communication network during the TXOP, or ii) cause the first communication device to transmit any PHY data units during the TXOP only when a network allocation vector (NAV) counter associated with a third communication network has expired.

BRIEF DESCRIPTION OF THE DRAWINGS

FIG. 5A is a timing diagram illustrating an example exchange of PHY data units in connection with a transmit opportunity period (TXOP) in a first communication network, according to an embodiment.

FIG. 5B is another timing diagram illustrating another example exchange of PHY data units in connection with a TXOP in a first communication network, according to an embodiment.

DETAILED DESCRIPTION

In some embodiments, a first communication protocol (e.g., the IEEE 802.11ax protocol or another suitable communication protocol) provides rules that promote more spatial reuse as compared to legacy communication protocols (e.g., the IEEE 802.11ac protocol or another suitable protocol). For example, in some embodiments, a communication device in a communication network uses an adjusted signal power threshold to determine if a communication channel is clear when processing valid signals known to be from a different communication network, where the adjusted signal power threshold is higher than a default signal power threshold used by the communication device when processing valid signals known to be from the same communication network. In some embodiments, the communication device can transmit a "spatial reuse signal" when a power level of a valid signal from the different communication network is lower than the adjusted signal power threshold. In some scenarios, however, when the communication device transmits the spatial reuse signal, the spatial reuse signal may interfere with the different-network signal and/or yet another signal from yet another network. Thus, in various embodiments described below, various techniques are utilized to mitigate problems to other networks caused by the transmission of spatial reuse signals.

Figure 1:
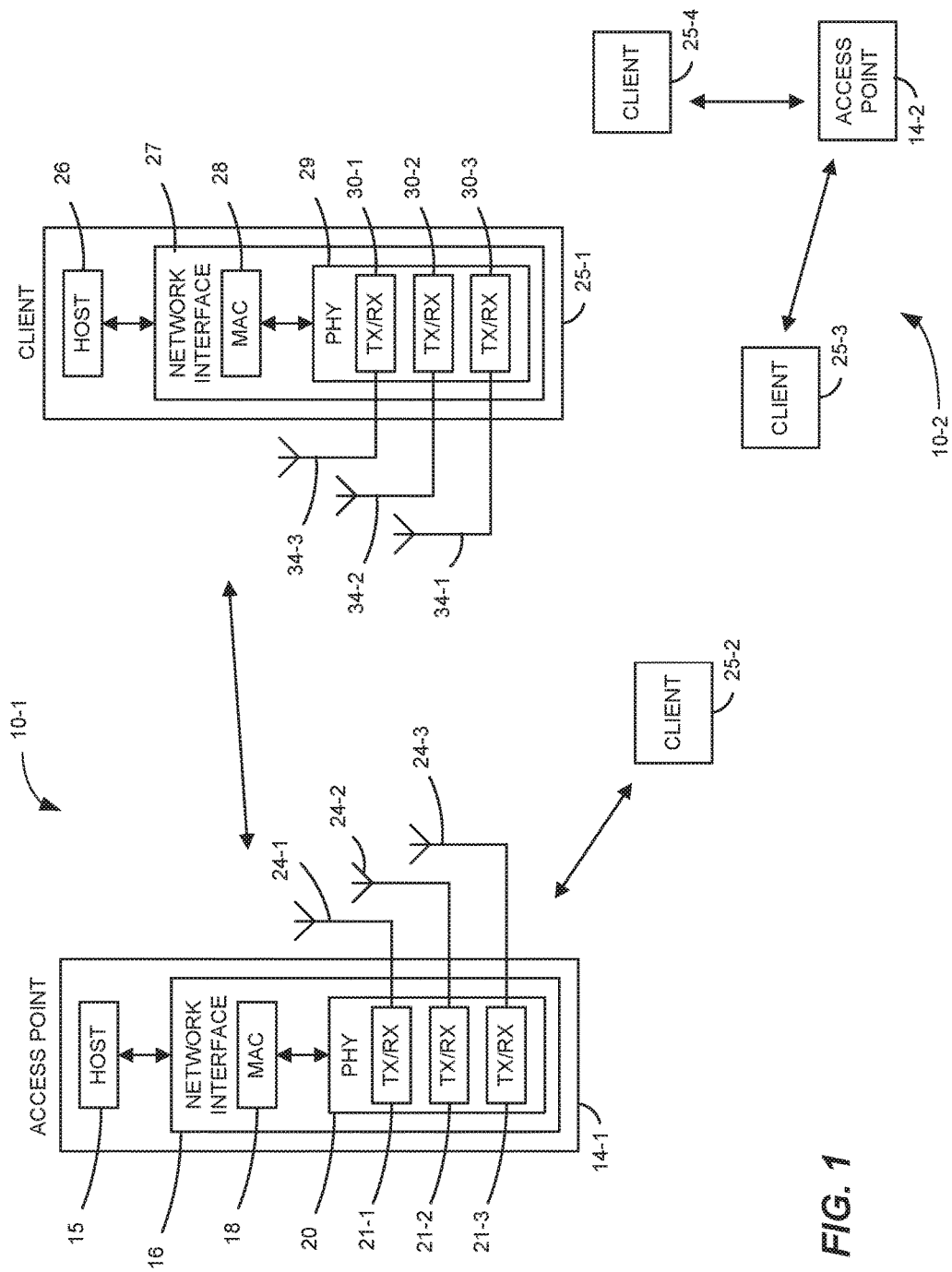
FIG. 1 is a block diagram of an example wireless local area network (WLAN), according to an embodiment.

FIG. 1 is a block diagram of example wireless local area networks (WLANs) 10-1 and 10-2, according to an embodiment. The number of WLANs depicted is only intended to be illustrative, and any suitable number may be present. Each WLAN 10 includes at least one AP 14. The configuration of the AP 14 may vary among different embodiments, but a typical configuration will now be described, using the AP 14-1 as an example. The AP 14-1 includes a host processor 15 coupled to a network interface device 16. The network interface device 16 includes a media access control layer (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14-1 includes different numbers (e.g., 1, 2, 4, 5, etc.) of transceivers 21 and different numbers (e.g., 1, 2, 4, 5, etc.) of antennas 24 in other embodiments. Although AP 14 includes the same number of transceivers 21 and antennas 24, in other embodiments the AP 14 includes a different number of transceivers 21 than antennas 24 and antenna switching techniques are utilized.

In various embodiments, the network interface device 16 is implemented on one or more integrated circuit (IC) devices. For example, in an embodiment, at least a portion of the MAC processor 18 is implemented on a first IC device and at least a portion of the PHY processor 20 is implemented on a second IC device. As another example, at least a portion of the MAC processor 18 and at least a portion of the PHY processor 20 are implemented on a single IC device.

Each WLAN 10 includes a plurality of client stations 25. Although two client stations 25 are illustrated in FIG. 1, each of the WLANs 10 includes different numbers (e.g., 1, 2, 3, 5, 6, etc.) of client stations 25 in various scenarios and embodiments.

The configuration of the client station 25 may vary among different embodiments, but a typically configuration will now be described, using the client station 25-1 as an example. The client station 25-1 includes a host processor 26 coupled to a network interface device 27. The network interface device 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and different numbers (e.g., 1, 2, 4, 5, etc.) of antennas 34 in other embodiments. Although the client station 25-1 includes the same number of transceivers 30 and antennas 34, in other embodiments the client station 25-1 includes a different number of transceivers 30 than antennas 34 and antenna switching techniques are utilized.

In various embodiments, the network interface device 27 is implemented on one or more IC devices. For example, in an embodiment, at least a portion of the MAC processor 28 is implemented on a first IC device and at least a portion of the PITY processor 29 is implemented on a second IC device. As another example, at least a portion of the MAC processor 28 and at least a portion of the PRY processor 29 are implemented on a single IC device.

In an embodiment, one or more of the other client stations of the WLANs 10 have a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment. These same variations may be present in the client stations 25 of the second WLAN 10-2.

In an embodiment, the AP 14 and the client stations 25 contend for communication medium using carrier sense multiple access with a collision avoidance (CSMA/CA) protocol or another suitable medium access protocol. In an embodiment, the AP 14 and the client stations employ a clear channel assessment (CCA) procedure, in which the AP/client station determines an energy level of the medium in order to determine whether the medium is busy or idle. If the energy level indicates the medium is idle, the device can transmit. If the energy level indicates the medium is busy, the device waits a backoff period and then checks the energy level of the medium again after the backoff period. A threshold energy level for determining whether the medium is idle or busy may depend upon the bandwidth of the channel being used by the device and on whether the energy corresponds to a transmission that conforms to the wireless communication protocol. For example, in the IEEE 802.11 Standard, if the channel bandwidth is 20 Megahertz (MHz), the threshold level is −82 decibel-milliwatts (dBm) for energy from valid 802.11 transmissions. For channel bandwidths of 40 MHz, 80 MHz, and 160 MHz, the threshold levels are −79 dBm, −76 dBm, and −73 dBm, respectively. Using these threshold levels for CCA is sometimes referred to herein as a "static CCA" procedure. These threshold levels are sometimes referred to herein as "default threshold levels". For energy not identified by the device as a valid 802.11 signal, the threshold level is −62 dBm.

In an embodiment, the AP 14 and the client stations 25 may also employ a dynamic CCA procedure. In the dynamic CCA procedure, the AP/client station may use a higher threshold level for valid signals (e.g., signals having a PHY header that the AP/client station can properly decode) from another network (e.g., an OBSS) as compared to the threshold level for valid signals from the network to which the AP/client station belongs (e.g., the same BSS). For example, an AP/client station might deem a 20 MHz channel to be idle if the energy level of a valid signal from another network is less than −62 dBm (i.e., the same threshold level as for energy corresponding to signals that are not valid signals), but deem the channel to be busy if the energy level of a signal from the same network is greater than −82 dBm. Thus, an energy level of −70 dBm of a valid signal from a different network would result in the device determining that the channel is idle, whereas an energy level of −70 dBm a valid signal from the same network would result in the device determining that the channel is busy. Providing a higher signal power threshold for transmissions corresponding to another network helps to promote spatial reuse between different BSSs, at least in some embodiments and/or scenarios. The higher signal power thresholds are sometimes referred to herein as the "adjusted threshold levels".

In order for communication device that is compliant with the first communication protocol (e.g., the IEEE 802.11ax protocol) to determine whether a given transmission corresponds to a same-BSS or to an OBSS, the device may obtain the BSS color from a PHY header in the transmission, and compare the BSS color in the PHY header to a color of the BSS to which the device belongs. If the BSS colors are the same, the device may conclude that the transmission corresponds to the same-BSS. If they are different, then the device may conclude that the transmission corresponds to an OBSS. If the transmission corresponds to an OBSS, the device may then use a higher power threshold when processing the transmission to determine whether the device can transmit, where the higher power threshold is higher than a default power threshold to be used when transmissions correspond to the same-BSS. However, not all transmissions in a wireless network will necessarily have BSS color information in the PHY header. Some transmissions, for example transmissions compliant with a legacy protocol (referred to herein as "legacy transmissions" or "legacy frames"), do not include PHY headers that specify BSS color.

According to an embodiment, a device in a wireless communication network may determine whether a legacy transmission corresponds to a same-BSS or an OBSS by analyzing a MAC address in the transmission and determining whether the MAC address is the same as the MAC address of the AP with which the device is associated. If they are the same, then the device determines that the legacy transmission corresponds to the same-BSS and uses the default power threshold. If the MAC address in the transmission is not the same as the MAC address of the AP, then the device determines that the legacy transmission corresponds to an OBSS and, consequently, uses the higher power threshold.

Figures 2A, 2B, 2C:
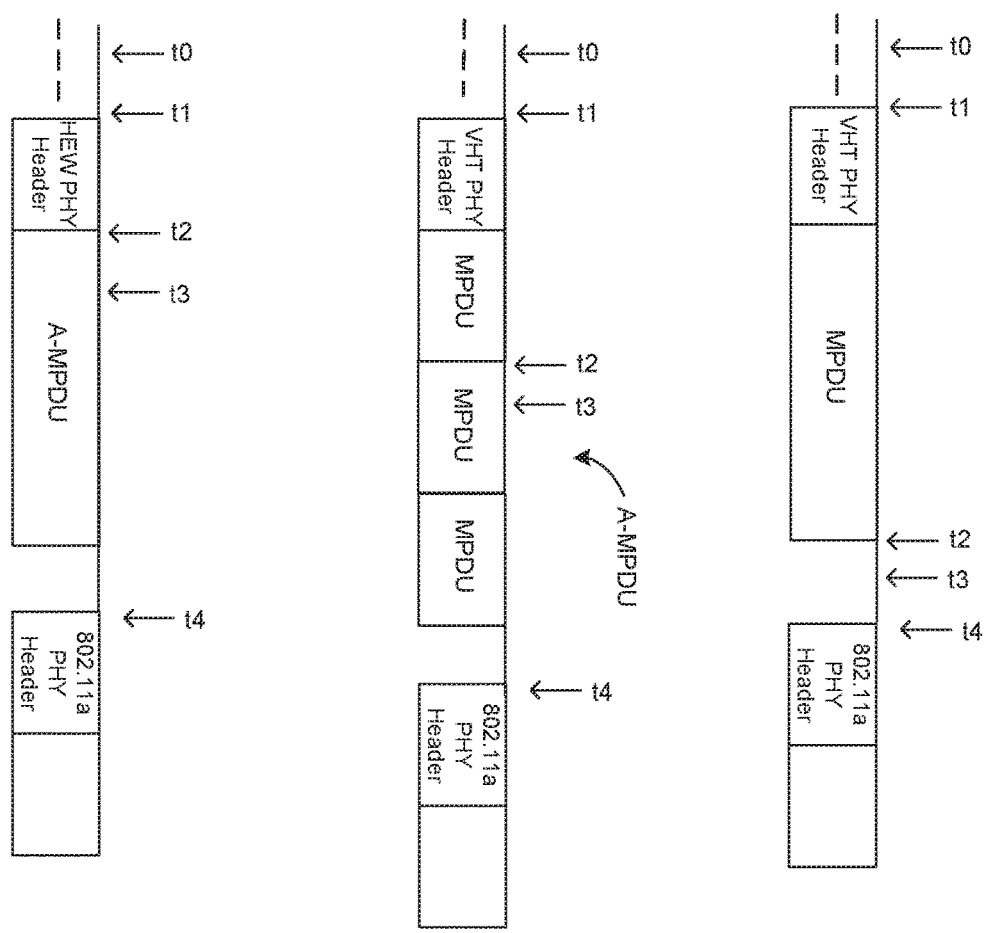
FIGS. 2A-C are timing diagrams of example backoff procedures performed by a communication device in connection with promoting spatial reuse in wireless communication networks, according to some embodiments.

FIGS. 2A-2C are timing diagrams illustrating example backoff procedures implemented by a communication device (e.g., the AP 14 or the client station 25), according to some embodiments. Referring now to FIG. 2A, at time to, the communication device determines that the medium is idle (e.g., that energy in the medium is below an energy detection (ED) threshold) and decrements a backoff counter. At time t1, the communication device begins receiving a PHY protocol data unit (PPDU) that conforms to the IEEE 802.11ax protocol and, determines that the medium is busy (e.g., that energy in the medium meets the ED threshold). In response to determining that the medium is busy, the communication device ceases decrementing the backoff counter. At time t2, the device has received the PHY header of the PPDU and processes the PHY header. In the scenario of FIG. 2A, the communication device determines the PPDU corresponds to a valid signal from an OBSS, and therefore compares an energy level of the PPDU to the adjusted CCA level. If the communication device determines that the energy level of the PPDU is below the adjusted CCA level, the communication device determines the communication medium to be idle (in spite of the fact that the PPDU is being transmitted), and resumes decrementing the backoff counter with each idle slot after time t3. In an embodiment, t3 corresponds to suitable time period (e.g., arbitration interframe space (AIFS), as defined by the IEEE 802.11 Standard, or another suitable time period such as a short interframe space (SIFS), a point coordination function (PCF) interframe space (PIFS), a distributed coordination function (DCF) interframe space (DIES), an extended interframe space (EIFS), as defined by the IEEE 802.11 Standard, etc.) after determining that the energy level of the PPDU is below the adjusted CCA level. In another embodiment, t3 occurs immediately after determining that the energy level of the PPDU is below the adjusted CCA level. At time t4, the communication device begins receiving another PPDU and the device determines that the communication medium is busy (e.g., that energy in the medium meets the ED threshold). In response to determining that the communication medium is busy, the device ceases decrementing the backoff counter.

Referring now to FIG. 2B, at time t0, the communication device determines that the medium is idle (e.g., that energy in the medium is below the ED threshold) and decrements a backoff counter. At time t1, the communication device begins receiving a PPDU that conforms to the IEEE 802.11ac protocol and, determines that the medium is busy (e.g., that energy in the medium meets the ED threshold). In response to determining that the medium is busy, the communication device ceases decrementing the backoff counter. At time t2, the device has received a MAC protocol data unit (MPDU) within the PPDU, and processes a MAC header of the MPDU. In the scenario of FIG. 2B, the communication device determines the PPDU corresponds to a valid signal, and that the PPDU is from an OBSS (by processing the MAC header), and therefore compares an energy level of the PPDU to the adjusted CCA level. If the communication device determines that the energy level of the PPDU is below the adjusted CCA level, the communication device determines the communication medium to be idle (in spite of the fact that the PPDU is being transmitted), and resumes decrementing the backoff counter with each idle slot after time t3. In an embodiment, t3 corresponds to suitable time period (e.g., AIFS, or another suitable time period) after determining that the energy level of the PPDU is below the adjusted CCA level. In another embodiment, t3 occurs immediately after determining that the energy level of the PPDU is below the adjusted CCA level. At time t4, the communication device begins receiving another PPDU and the device determines that the communication medium is busy (e.g., that energy in the medium meets the ED threshold). In response to determining that the communication medium is busy, the device ceases decrementing the backoff counter.

Referring now to FIG. 2C, at time t0, the communication device determines that the medium is idle (e.g., that energy in the medium is below the ED threshold) and decrements a backoff counter. At time t1, the communication device begins receiving a PPDU that conforms to the IEEE 802.11ac protocol and, determines that the medium is busy (e.g., that energy in the medium meets the ED threshold). In response to determining that the medium is busy, the communication device ceases decrementing the backoff counter. At time t2, the device has received the entire PPDU, and processes a MAC header of an MPDU within the PPDU. In the scenario of FIG. 2C, the communication device determines the PPDU corresponds to a valid signal, and determines that the PPDU is from an OBSS (by processing the MAC header), and therefore compares an energy level of the PPDU to the adjusted CCA level. If the communication device determines that the energy level of the PPDU is below the adjusted CCA level, the communication device determines the communication medium to be idle (in spite of the fact that the PPDU is being transmitted), and resumes decrementing the backoff counter with each idle slot after time t3. In an embodiment, t3 corresponds to suitable time period (e.g., AIFS, or another suitable time period) after determining that the energy level of the PPDU is below the adjusted CCA level. In another embodiment, t3 occurs immediately after determining that the energy level of the PPDU is below the adjusted CCA level. At time t4, the communication device begins receiving another PPDU and the device determines that the communication medium is busy (e.g., that energy in the medium meets the ED threshold). In response to determining that the communication medium is busy, the device ceases decrementing the backoff counter.

As can be seen in FIGS. 2B and 2C, in some embodiments, because the device must analyze a MAC header in a legacy PPDU in order to determine if the PPDU is a same-BSS or an OBSS PPDU, the device first must entirely receive an MPDU that includes the MAC header before information in the MAC header can be verified. For example, in some embodiments, the MPDU utilizes error control coding (ECC), and the device uses parity information in the MPDU (e.g., at an end of the MPDU) to verify that the MPDU (including the MAC header) is error free and/or to correct errors in the MPDU.

Further details of embodiments of backoff procedures are described in U.S. patent application Ser. No. 14/961,558, entitled "Methods and Apparatus for Carrying Out Backoff Operations," filed on Dec. 7, 2015, which is incorporated by reference herein. One or more of the backoff procedure techniques described in U.S. patent application Ser. No. 14/961,558, are utilized in conjunction with techniques described herein, according to some embodiments.

In some scenarios, the backoff counter discussed above may expire while the communication device is receiving the PPDU from the other network (the "different network signal"). When the backoff counter expires while receiving the different-network signal, the communication device may transmit a spatial reuse signal, according to some embodiments. In some scenarios, such a spatial reuse signal may interfere with the different-network signal in the other network. Such interference may be worse if a first device in the other network is relative close to the communication device, whereas a second device in the other network is relative distant from the communication device, at least in some scenarios. For example, if the different-network signal is being transmitted by the far second device to the near first device, the spatial reuse signal may interfere with the different-network signal as seen at the near first device.

Thus, the communication device, when transmitting a spatial reuse signal such as described above, uses a reduced transmit power to mitigate interference that may arise as a result of transmitting the spatial reuse signal, according to some embodiments.

Figure 3:
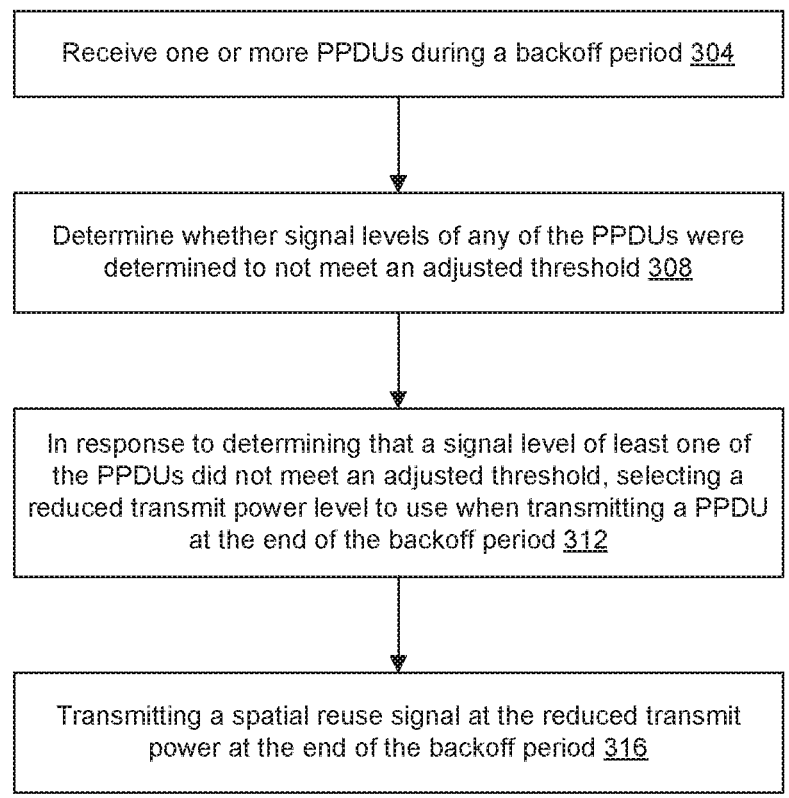
FIG. 3 is a flow diagram of an example method of transmitting a spatial reuse signal in connection with a backoff procedure, according to an embodiment.

FIG. 3 is a flow diagram of an example method 300 of transmitting a spatial reuse signal in connection with a backoff procedure, according to an embodiment. In some embodiments, the method 300 is implemented by the AP 14-1 (FIG. 1). As an example, the network interface 16 is configured to implement the method 300, according to an embodiment. For instance, the MAC processor 18 is configured to implement at least a portion of the method 300, according to an embodiment. Similarly, the PITY processor 20 is configured to implement at least a portion of the method 300, according to an embodiment. As another example, the MAC processor 18 is configured to implement a first portion of the method 300, and the PHY processor 20 is configured to implement a second portion of the method 300, according to an embodiment.

In other embodiments, the method 300 is implemented by the client station 25-1. As an example, the network interface 27 is configured to implement the method 300, according to an embodiment. For instance, the MAC processor 28 is configured to implement at least a portion of the method 300, according to an embodiment. Similarly, the PHY processor 29 is configured to implement at least a portion of the method 300, according to an embodiment. As another example, the MAC processor 28 is configured to implement a first portion of the method 300, and the PITY processor 29 is configured to implement a second portion of the method 300, according to an embodiment.

In other embodiments, the method 300 is implemented by another suitable communication device.

The example method 300 relates to a backoff period utilized by the communication device. In an embodiment, the communication device performs a backoff procedure in connection with transmitting a spatial reuse signal, where the communication device waits for a time period (e.g., the backoff period) before attempting to transmit a PHY data unit. In some embodiments, the communication device employs a backoff timer to measure time in the backoff period. For example, the communication device sets the timer to an initial value at the beginning of the backoff time period, and when the backoff timer expires, this indicates to the communication device that the backoff period has expired, according to an embodiment. As discussed above, the communication device may pause the backoff timer in response to certain circumstances, in some embodiments. The communication device may resume the counting of a paused backoff timer in response to certain circumstances, in some embodiments. In some embodiments, the communication device may reset the backoff timer to the initial value (or another value) under certain circumstances.

At block 304, the communication device receives one or more PHY data units (e.g., PPDUs) during the backoff period. As discussed above, when receiving a PPDU during the backoff period, the communication device may compare a signal power level corresponding to the received PPDU to an adjusted power level threshold. For example, in some embodiments, the adjusted power level threshold is used for analyzing valid PPDUs determined to be from a different communication network (e.g., different-BSS).

At block 308, it is determined whether a respective signal power level of any of the PPDUs received at block 304 was compared to the adjusted power level threshold and was determined to not meet the adjusted power level threshold (e.g., was less than the threshold, less than or equal to the threshold, etc.).

At block 312, in response to determining (at block 308) that one or more respective signal power levels of one or more of the PPDUs received at block 304 were compared to the adjusted power level threshold and did not meet the adjusted power level threshold, the communication device selects a reduced transmit power level to use when transmitting the spatial reuse signal (e.g., a PPDU) at the end of the backoff period (e.g., when the backoff timer expires). In an embodiment, the reduced transmit power level is less than a default transmit power level. In an embodiment, the default transmit power level corresponds to a transmit power level that the communication device would utilize if all of the respective signal power levels of the one or more PPDUs received at block 304 did not meet the default power level threshold.

At block 316, the communication device transmits the spatial reuse signal (e.g., a PPDU) at the reduced transmit power in response to determining that the backoff period ended. In an embodiment, the communication device transmits the spatial reuse signal (e.g., a PPDU) at the reduced transmit power in response to determining that the backoff timer expired. In an embodiment, the communication device transmits the spatial reuse signal (e.g., a PPDU) at the reduced transmit power also in response to determining (at block 308) that one or more respective signal power levels of one or more of the PPDUs received at block 304 did not meet the adjusted power level threshold.

Figure 4:
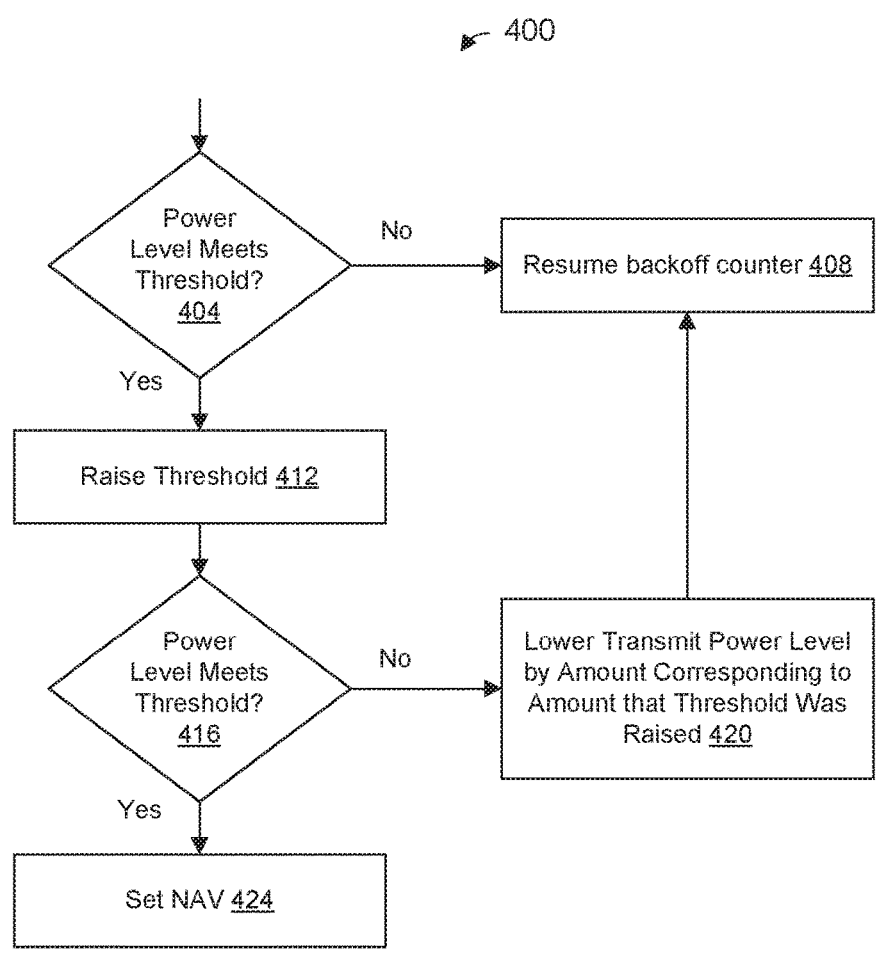
FIG. 4 is a flow diagram of an example method of processing received physical layer (PHY) data units from other communication networks during a backoff period, according to an embodiment.

FIG. 4 is a flow diagram of an example method 400 of processing received PPDUs from other networks during a backoff period, according to an embodiment. In some embodiments, the method 400 is performed in conjunction with the method 300 of FIG. 3. In other embodiments, the method 400 is performed in conjunction with a suitable backoff procedure different than the method 300. Similarly, in some embodiments, the method 300 is performed, but not in conjunction with the method 400.

In some embodiments, the network interface 16 (e.g., the MAC processor 18 and/or the PHY processor 20) and/or the network interface 27 (e.g., the MAC processor 28 and/or the PHY processor 29) are configured to implement the method 400 in a manner similar to that described above with respect to the method 300 of FIG. 3, according to some embodiments. In other embodiments, the method 400 is implemented by another suitable communication device.

In an embodiment, the method 400 starts in response to receiving a PHY data unit that is determined by the communication device to be valid. In an embodiment, it is assumed that the communication device has paused a backoff timer in response to the PHY data unit.

At block 404, the communication determines whether a signal power level of the received PHY data unit meets a power level threshold, $CCALevel_{Current}$. In some embodiments and/or scenarios, the method 400 is performed multiple time during the backoff period, and the particular threshold used at block 404 may vary depending on which instance of the method 400 is being performed during the backoff period. For example, if it is the first time the method 400 is being performed during the backoff period, the power level threshold is a default threshold, according to an embodiment. As another example, if it is not the first time the method 400 is being performed during the backoff period, the power level threshold may be an adjusted threshold that is higher than the default threshold, according to an embodiment. Also, in some embodiments, the particular threshold used at block 404 may vary depending on the channel bandwidth that the communication device is utilizing. For instance, in an embodiment, the default threshold is −82 dBm for a 20 MHz channel, −79 dBm for a 40 MHz channel, −76 dBm for an 80 MHz channel, and −73 dBm for a 160 MHz channel. In other embodiments, other suitable default threshold levels are utilized.

If the communication device determines at block 404 that the signal power level of the received PHY data unit does not meet (e.g., is less than, etc.) the power level threshold, the flow proceeds to block 408. At block 408, the communication device resumes the backoff counter (e.g., causes the backoff counter to resume counting). For example, if the communication device determines at block 404 that the signal power level of the received PHY data unit does not meet the power level threshold, the communication device determines that the channel is idle and therefore resumes the backoff counter.

On the other hand, if the communication device determines at block 404 that the signal power level of the received PITY data unit meets (e.g., is greater than, is greater than or equal to, etc.) the power level threshold, the flow proceeds to block 412. At block 412, the communication device raises the power level threshold. In an embodiment, the communication device raises a current value of the power level threshold, $CCALevel_{Current}$, by a unit amount $Delta_{CCLevel}$, where $Delta_{CCLevel}$ is a suitable value such as 2 dBm, 5 dBm, 10 dBm, etc. In an embodiment, block 412 comprises adjusting the current threshold, $Thresh_{Current}$, according to:

$$CCALevel_{Current} = CCALevel_{Current} + Delta_{CCLevel},\qquad \text{Equ. 1}$$

to generate an adjusted power level threshold.

In some embodiments, block 412 comprises incrementing an index, n, that represents how many times the power level threshold has been raised during the backoff period, where n=0 initially. In an embodiment, block 412 comprises incrementing n, and adjusting the current threshold according to:

$$CCALevel_{Current} = CCALevel_{Default} + n*Delta_{CCLevel}.\qquad \text{Equ. 2}$$

At block 416, the communication determines whether a signal power level of the received PHY data unit meets the adjusted power level threshold, $CCALevel_{current}$. If the communication device determines at block 416 that the signal power level of the received PHY data unit does not meet (e.g., is less than, etc.) the adjusted power level threshold, the flow proceeds to block 420.

At block 420, the communication device reduces a transmit power level to use when transmitting the spatial reuse signal at the end of the backoff period (e.g., when the backoff timer expires). In an embodiment, the communication device reduces a current value of the transmit power, $TXPower_{Current}$, by a unit amount $Delta_{TXPower}$, where $Delta_{TXPower}$ is a suitable value such as 2 dBm, 5 dBm, 10 dBm, etc. In an embodiment, block 420 comprises adjusting the current transmit power, $TXPower_{Current}$, according to:

$$TXPower_{Current} = TXPower_{Current} - Delta_{TXPower},\qquad \text{Equ. 3}$$

to generate an adjusted transmit power level.

In some embodiments, block 420 comprises utilizing the index n. For example, in an embodiment, block 420 comprises adjusting the transmit power level according to:

$$TXPower_{Current} = TXPower_{Default} - n*Delta_{TXPower},\qquad \text{Equ. 4}$$

Thus, according to an embodiment, blocks 412 and 420 correspond to reducing the transmit power by a unit amount, $Delta_{TXPower}$, each time the power level threshold is increased by a unit amount, $Delta_{CCLevel}$.

After block 420, the flow then proceeds to block 408, at which the communication device resumes the backoff counter.

On the other hand, if the communication determines at block 416 that the signal power level of the received PHY data unit meets (e.g., is greater than, is greater than or equal to, etc.) the adjusted power level threshold, $CCALevel_{Current}$, the flow proceeds to block 424. At block 424, the communication device sets a network allocation vector (NAV) timer according to a determined time duration of the PHY data unit received at block 404. For example, in an embodiment, the communication device sets the NAV timer according to duration information included in a field (e.g., a length field, a duration field, etc.) in a PHY header of the PHY data unit and/or in a MAC header in the PHY data unit. The NAV timer is used by the communication device to keep track of when the wireless medium is busy, in some embodiments. For example, when the communication device receives a valid PHY data unit, the communication device analyzes duration information included in a field (e.g., a length field, a duration field, etc.) in a PHY header of the PHY data unit and/or in a MAC header in the PHY data unit, to estimate a time duration of the PHY data unit, in some embodiments. The communication device then sets the NAV timer according to the estimated time duration, in an embodiment. When the NAV timer expires, this indicates to the communication device that transmission of the PHY data unit has ended and the wireless medium may no longer be busy, in some embodiments. On the other hand, when the NAV time has not yet expired, this indicates to the communication device that transmission of the PHY data unit is still ongoing and the wireless medium is still busy, in some embodiments.

In some embodiments, block 424 also includes reducing the power level threshold by an amount corresponding to the amount by which the power level threshold was raised at block 412. Thus, in an embodiment, block 424 comprises adjusting the current threshold, $Thresh_{Current}$, according to:

$$CCALevel_{Current} = CCALevel_{Current} - Delta_{CCLevel},\qquad \text{Equ. 5}$$

to generate an adjusted power level threshold.

In some embodiments, block 412 comprises decrementing the index, n, which represents how many times the power level threshold has been raised during the backoff period. In an embodiment, block 424 comprises decrementing n, and adjusting the current threshold according to Equation 2.

In some embodiments, a communication device reserves a communication medium for a time period, e.g., a transmit opportunity period (TXOP). For example, in some embodiments, a communication device reserves a communication medium for a TXOP by transmitting a request-to-send (RTS) control frame to another communication device, where the RTS control frame includes an indication of a time period for which the communication device is seeking to reserve the communication medium. The other communication device responds to the RTS control frame with a clear-to-send (CTS) control frame, which confirms the reservation of the TXOP, according to an embodiment.

To promote spatial reuse, in some embodiments, the communication device reserving the TXOP determines that transmissions during the TXOP should utilize a reduced transmit power and that communication devices should use an increased signal power threshold for backoff operations during the TXOP. In some embodiments, to reserve a TXOP that also promotes spatial reuse, the communication device generates and transmits a spatial reuse TXOP request (SR-REQ) control frame. In some embodiments, the SR-REQ control frame is similar to an RTS control frame, but includes spatial reuse parameters. In an embodiment, the included spatial reuse parameters comprises an indication of a reduced transmit power to be used when transmitting during the TXOP and an indication of an increased signal power threshold for backoff operations during the TXOP. In an embodiment, the indication of the reduced transmit power to be used when transmitting during the TXOP is a parameter that specifies a reduced transmit power level. In an embodiment, the indication of the increased signal power threshold for backoff operations during the TXOP is a parameter that specifies the increased signal power threshold for backoff operations. In an embodiment, the spatial reuse parameters also include a received signal strength indicator (RSSI) parameter that indicates, from the standpoint of a communication device, an RSSI level below which a colliding PHY data unit will not prevent a successful reception of a desired PHY data unit. In an embodiment, the spatial reuse parameters also include an equivalent isotropically radiated power (EIRP) parameter that indicates a transmit power of the communication device. In some embodiments, a communication device outside of the network in which the SR-REQ was transmitted (OBSS device) uses the spatial reuse parameters to determine whether the OBSS device can transmit during the TXOP, and/or at what power level and which signal power threshold (for backoff operations) the OBSS device should use during the TXOP.

FIG. 5A is a timing diagram illustrating an example exchange 500 of PHY data units in connection with a TXOP, according to an embodiment. A first access point (AP1) generates and transmits a first control frame (SR-REQ) 504. In an embodiment, SR-REQ 504 is similar to a RTS utilized for requesting a TXOP, but includes spatial reuse parameters to promote spatial reuse. In some embodiments, the SR-REQ 504 includes spatial reuse parameters such as i) an indication of a reduced transmit power to be used when transmitting during the TXOP, and ii) an indication of an increased signal power threshold for backoff operations during the TXOP. In an embodiment, the indication of a reduced transmit power to be used is an EIRP parameter. In some embodiments, the SR-REQ 504 additionally and/or alternatively includes one or more spatial reuse parameters such as an RSSI parameter and/or an EIRP parameter. AP1 transmits SR-REQ 504 to a station (STA11) in a first communication network (BSS1) served by AP1.

STA11 generates and transmits a second control frame (SR-RSP) 508 in response to receiving SR-REQ 504. In an embodiment, SR-RSP 508 is similar to a CTS utilized in connection with confirming a TXOP, but includes spatial reuse parameters to promote spatial reuse. In some embodiments, the SR-RSP 508 includes spatial reuse parameters such as i) an indication of a reduced transmit power that STA11 will utilize in TXOP 512, and ii) an indication of an increased signal power threshold that STA11 will utilize in TXOP 5121. In some embodiments in which the SR-REQ 504 additionally and/or alternatively includes one or more spatial reuse parameters such as an RSSI parameter and/or an EIRP parameter, the SR-RSP 508 additionally and/or alternatively includes the one or more spatial reuse parameters such as the RSSI parameter and/or the EIRP parameter. STA11 transmits SR-RSP 508 to AP1.

In an embodiment, exchange of SR-REQ 504 and SR-RSP 508 creates a TXOP that reserves a communication medium, where AP1 is the "TXOP holder". In a second network (BSS2) served by a second access point (AP2), a station (STA21) in BSS2 receives SR-REQ 504.

In an embodiment, AP1 transmits SR-REQ 504 at a default transmit power level even when a reduced transmit power is to be used when transmitting during the TXOP 512 and when SR-REQ 504 includes the indication of the reduced transmit power. Similarly, in an embodiment, STA11 transmits SR-RSP 508 at a default transmit power level even when the reduced transmit power is to be used when transmitting during the TXOP 512 and when SR-RSP 508 includes the indication of the reduced transmit power. In some embodiments and/or scenarios, transmitting SR-REQ 504 and/or SR-RSP 508 at a higher transmit power level (e.g., the default transmit power level) than the reduced transmit power helps ensure (e.g., increases the likelihood) that other communication devices in other networks will receive SR-REQ 504 and/or SR-RSP 508 and thus will receive the spatial reuse parameters included in SR-REQ 504 and/or SR-RSP 508. Because transmitting SR-REQ 504 and/or SR-RSP 508 at the higher transmit power level helps ensure (e.g., increases the likelihood) that other communication devices in other networks will receive the spatial reuse parameters included in SR-REQ 504 and/or SR-RSP 508, transmitting SR-REQ 504 and/or SR-RSP 508 at the higher transmit power level also helps to promote spatial reuse, at least in some embodiments and/or scenarios.

During TXOP 512, AP1 transmits PHY data units 516 and 520 to STA 11 at a reduced transit signal power as indicated in SR-REQ 504 and/or SR-RSP 508. Additionally, STA 11 transmits acknowledgments 524 and 528 to STA 11 at a reduced transit signal power as indicated in SR-REQ 504 and/or SR-RSP 508.

STA21 determines, based on SR-REQ 504 and/or SR-RSP 508, whether STA21 can transmit a spatial reuse signal during TXOP 512. For example, STA21 determines a received signal power of SR-REQ 504, and determines, based on the received signal power of SR-REQ 504, whether STA21 can transmit a spatial reuse signal during TXOP 512. Because SR-REQ 504 is transmitted at a higher transmit power than PHY data units 516 and 520, however, STA21 determines whether STA21 can transmit a spatial reuse signal during TXOP 512 also based on the reduced transmit signal power that AP1 and STA11 will utilize in TXOP 512, in some embodiments and/or scenarios. For example, STA21 calculates an adjusted received signal power, $RXPower_{Adjusted}$, corresponding to SR-REQ 504 using i) the determine received signal power, $RXPower_{Actual}$, of SR-REQ 504 and ii) the reduced transmit signal power as indicated in SR-REQ 504, according to an embodiment. For instance, if the reduced transmit signal power corresponds to Equ. 4, STA21 calculates the adjusted received signal power, $RXPower_{Adjusted}$, according to:

$$RXPower_{Adjusted} = RXPower_{Actual} - n*Delta_{TXPower}, \qquad \text{Equ. 6}$$

in an embodiment. In an embodiment, STA21 compares the adjusted received signal power, $RXPower_{Aadjustd}$, to a signal power threshold (e.g., $CCALevel_{Default}$, $CCALevel_{Current}$, etc.), and STA21 determines whether STA21 can transmit during TXOP 512 based on the comparison. For example, in an embodiment, if $RXPower_{Adjusted}$ meets the signal power threshold (e.g., is greater than, is greater than or equal to, etc.), then STA21 determines that STA21 cannot transmit during TXOP 512, according to an embodiment. As another example, if $RXPower_{Adjusted}$ does not meet the signal power threshold (e.g., is less than, etc.), then STA21 determines that STA21 can transmit during TXOP 512, according to an embodiment. In some embodiments, even if $RXPower_{Adjusted}$ does not meet the signal power threshold, STA21 determines that STA21 can transmit during TXOP 512 only if one or more other suitable conditions are satisfied, according to various embodiments.

In the scenario illustrated in FIG. 5A, STA21 determined that $RXPower_{Adjusted}$ corresponding to SR-REQ 504 meets the signal power threshold, and thus STA21 determined that STA21 cannot transmit during TXOP 512. STA21 therefore sets a NAV counter to a time duration based on time duration information regarding the TXOP 512 included in SR-REQ 504.

FIG. 5B is a timing diagram illustrating an example exchange 550 of PHY data units in connection with a TXOP, according to an embodiment. The exchange 550 is similar to the exchange 500 of FIG. 5A, and like-numbered elements are not described in detail merely for purposes of brevity.

In the scenario illustrated in FIG. 5B, STA21 determined that $RXPower_{Adjusted}$ corresponding to SR-REQ 504 does not meet the signal power threshold, and that STA21 can transmit during TXOP 512.

In an embodiment, STA21 waits a suitable time period 540 (e.g., AIFS, SIFS, PIFS, DIFS, EIFS, etc.) after the end of SR-REQ 504, and then commences a backoff period 544 (e.g., starts a backoff counter). After the backoff period 544, for example when the backoff timer expires, STA21 transmits a spatial reuse signal 550 to AP2 during TXOP 512. In an embodiment, if STA21 compared $RXPower_{Adjusted}$ to an adjusted signal power threshold higher than a default signal power threshold, then STA21 transmits spatial reuse signal 550 at a reduced transmit signal power level in a manner the same as or similar to the techniques discussed above with reference to FIGS. 3 and/or 4.

Referring to FIGS. 5A and 5B, if AP1 were permitted to transmit one or more subsequent single user PHY data units to one or more client stations different than STA11 during TXOP 512, the SR parameters for transmissions to the one or more client stations different than STA11 may be different than the SR parameters in control frames 504 and 508 (corresponding to transmissions to STA11). Therefore, STA21 could not use SR parameters in control frames 504 and 508 for spatial reuse purposes with regard to the transmissions to the one or more client stations different than STA11. Accordingly, in an embodiment, AP1 is not permitted to transmit one or more subsequent single user PHY data units to one or more client stations different than STA11 during TXOP 512. In other words, AP1 is permitted to transmit single user PHY data units to only one client station during TXOP 512, according to an embodiment. In other embodiments, however, AP1 is permitted to transmit single user PHY data units to more than one client station during TXOP 512, according to an embodiment.

Figure 6:
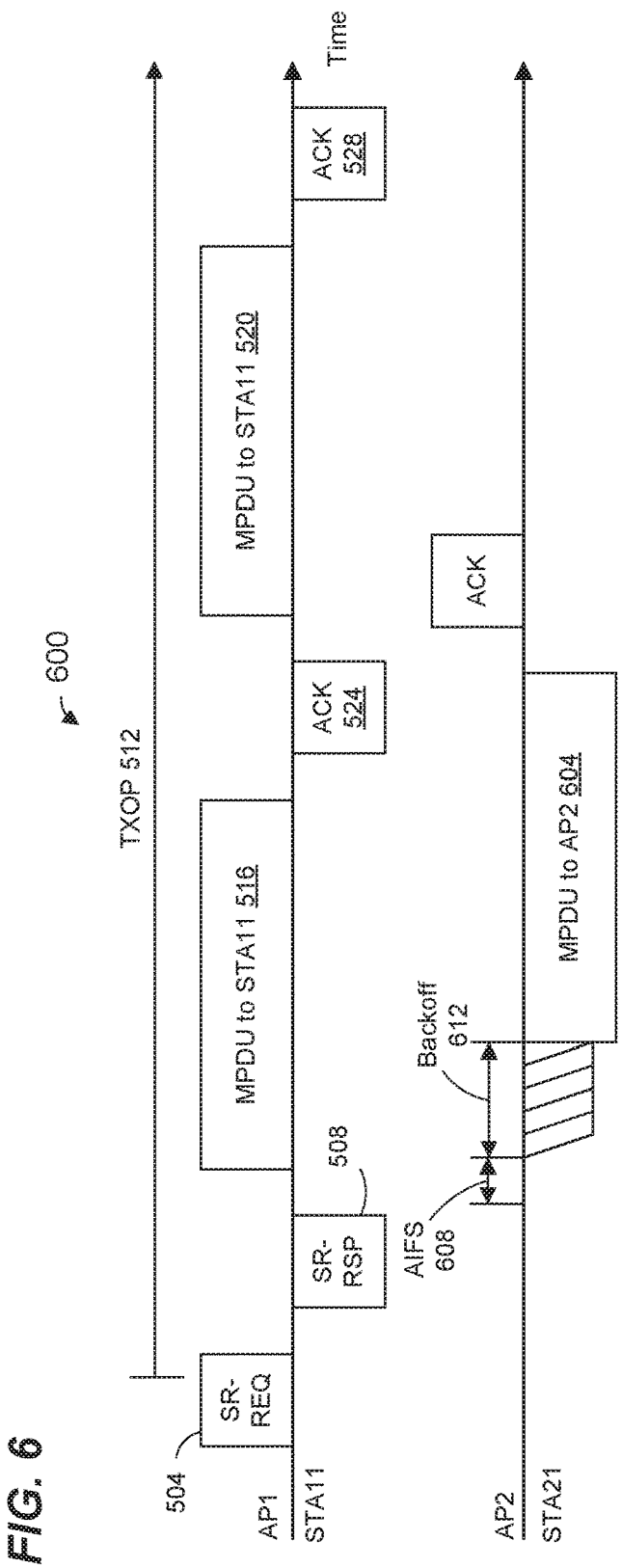
FIG. 6 is another timing diagram illustrating yet another example exchange of PHY data units in connection with a TXOP in a first communication network, according to an embodiment.

FIG. 6 is a timing diagram illustrating an example exchange 600 of PHY data units in connection with a TXOP, according to an embodiment. The exchange 600 is similar to the exchange 500 of FIG. 5A, and like-numbered elements are not described in detail merely for purposes of brevity.

In the scenario illustrated in FIG. 6, STA21 determined that $RXPower_{Adjusted}$ corresponding to SR-REQ 504 does not meet the signal power threshold, and that STA21 can transmit during TXOP 512. In an embodiment, before STA21 can commence any transmission during TXOP 512, STA21 first performs a backoff operation. For example, as illustrated in FIG. 6, when STA21 determines that a PHY data unit 604 is to be transmitted during TXOP 512, STA21 first waits a suitable time period 608 (e.g., AIFS, SIFS, PIFS, DIFS, EIFS, etc.), and then commences a backoff period 612 (e.g., starts a backoff counter). After the backoff period 612, for example when the backoff timer expires, STA21 transmits the spatial reuse signal 604 to AP2 during TXOP 512. In an embodiment, STA21 transmits spatial reuse signal 604 at a reduced transmit signal power level in a manner the same as or similar to the techniques discussed above with reference to FIGS. 3 and/or 4.

In an embodiment, one or more backoff parameters utilized for the backoff operation illustrated in FIG. 6 are different than default backoff parameters that are used for non-SR transmissions. For example, one or more of the following backoff parameters are different as compared to default backoff parameters such as: a duration of the wait time period 608, a contention window minimum size (CWmin), a contention window maximum size (CWmax), etc. For example, in an embodiment, the backoff period 612 is determined by pseudo-randomly choosing an integer with uniform distribution over an interval [0, CW], where CW is a parameter corresponding to a maximum size of the backoff period 612. CW is initially set to CWmin. After any unsuccessful transmission attempt, another backoff is performed with a new CW value updated according to:

$$CW=2*(CW+1)-1, \qquad \text{Equ. 7}$$

where an upper bound of CW is CWmax.

In an embodiment, when a backoff operation for an SR transmission is to be performed, backoff state information for non-SR transmissions (e.g., for enhanced distributed channel access (EDCA) backoff operation as defined in the IEEE 802.11 Standard) is stored in a memory device. In various embodiments, backoff state information for non-SR transmissions that is stored includes one or more of: a duration of the wait time period (similar to the wait time period 608), CW, CWmin, CWmax, a current value of a backoff counter, etc. In an embodiment, when the SR transmission is completed, the stored backoff information is retrieved from memory and restored for non-SR backoff operations.

In an embodiment when one or more backoff parameters utilized for the SR transmissions are different than default backoff parameters that are used for non-SR transmissions (e.g., for enhanced distributed channel access (EDCA) backoff operation as defined in the IEEE 802.11 Standard), an access point determines one or more SR backoff parameters utilized for the SR transmissions and transmits the one or more SR backoff parameters to client stations served by the access point. For example, in some embodiments, the access point transmits SR backoff parameters in a beacon transmission or a suitable control frame.

Referring now to FIGS. 5A, 5B, and 6, in some scenarios, when TXOP 512 begins, a NAV counter of STA21 is not zero because of a transmission from, for example, a third network served by a third access point (AP3). If STA21 transmits PHY data unit 550, 604 when the NAV counter is not zero, the PHY data unit 550, 604 may interfere with a transmission in the third network served by AP3. Thus, in some embodiments, a communication device is not permitted to perform an SR transmission when a NAV counter associated with a third network is not zero. In other words, a communication device determines whether a NAV counter associated with the third network is zero, and perform an SR transmission only when it is determined that the NAV counter is zero, according to an embodiment.

As discussed above with respect to FIG. 4, a NAV timer is set in connection with comparing a signal power level to an adjusted power level threshold (e.g., as compared to a default power level threshold), in connection with some embodiments. Also as discussed above with respect to FIG. 4, a NAV timer is set in connection with an adjusted transmit power level, according to some embodiments. In some embodiments, when it is determined to perform an SR transmission and when it is determined that a NAV counter associated with a third network is zero, an SR transmit power level for the SR transmission is set so that the SR transmit power level is not higher than a transmit power level set in connection with the NAV timer, according to an embodiment.

Figure 7:
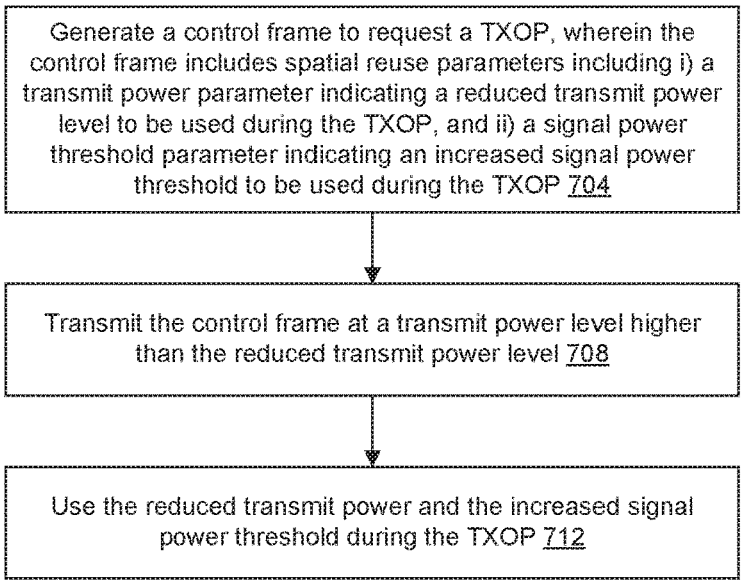
FIG. 7 is a flow diagram of an example method for establishing a TXOP that promotes spatial reuse, according to an embodiment.

FIG. 7 is a flow diagram of an example method 700 for establishing a TXOP that promotes spatial reuse, according to an embodiment. In some embodiments, the method 700 is implemented by the AP 14-1 (FIG. 1). As an example, the network interface 16 is configured to implement the method 700, according to some embodiments. For instance, the MAC processor 18 and/or the PHY processor 20 are configured to implement the method 700, according to an embodiment. In other embodiments, the method 700 is implemented by the client station 25-1. As an example, the network interface 27 is configured to implement the method 700, according to an embodiment. For instance, the MAC processor 28 and/or the PHY processor 29 are configured to implement the method 700, according to some embodiments. In other embodiments, the method 700 is implemented by another suitable communication device.

At block 704, a communication device generates a control frame to request a TXOP. The control frame includes spatial reuse parameters including i) a transmit power parameter indicating a reduced transmit power level to be used during the TXOP, and ii) a signal power threshold parameter indicating an increased signal power threshold to be used during the TXOP, in an embodiment. In an embodiment, the control frame generated at block 704 corresponds to the SR-REQ frame 504 discussed above.

At block 708, the communication device transmits the control frame at a transmit power level higher than the reduced transmit power level indicated by the transmit power parameter in the control frame. In an embodiment, the control frame is transmitted at a default power level used in conjunction with non-SR transmissions.

At block 712, after transmitting the control frame at block 708, the communication device transmits PHY data units at or below the reduced transmit power level during the TXOP. Also at block 712, the communication device uses the increased signal power threshold (or one or more further increased signal power thresholds) to perform backoff operations during the TXOP.

In some embodiments, during the TXOP, the communication device (first communication device) is only permitted to transmit to a single second communication device. Thus, in some embodiments, block 712 includes the first communication device transmitting PHY data units, during the TXOP, to only a single second communication device. In other embodiments, however, block 712 includes the first communication device transmitting PHY data units, during the TXOP, to multiple different second communication devices.

In some embodiments, the method 700 also includes receiving another control frame (a second control frame) responsive to the transmitted control frame (the first control frame). The second control frame includes spatial reuse parameters including i) a transmit power parameter indicating a reduced transmit power level to be used during the TXOP, and ii) a signal power threshold parameter indicating an increased signal power threshold to be used during the TXOP, in an embodiment. In some embodiments and/or scenarios, the transmit power parameter and the signal power threshold parameter in the second control frame are the same as the transmit power parameter and the signal power threshold parameter in the first control frame. In other embodiments and/or scenarios, however, one or both of the transmit power parameter and the signal power threshold parameter in the second control frame are different than the transmit power parameter and the signal power threshold parameter in the first control frame. In an embodiment, the second control frame corresponds to the SR-RSP frame 508 discussed above.

Figure 8:
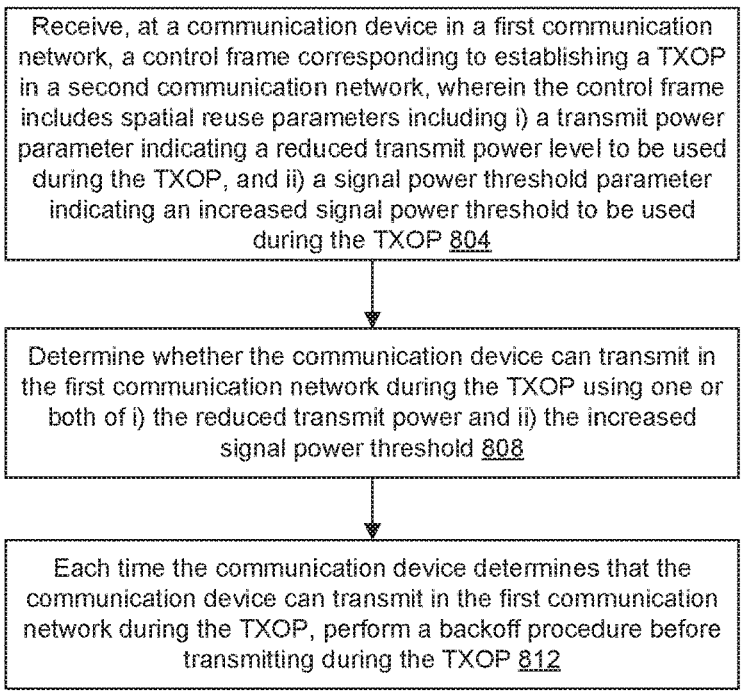
FIG. 8 is a flow diagram of an example method for transmitting spatial reuse transmissions in a first communication network during a TXOP in a second communication network, according to an embodiment.

FIG. 8 is a flow diagram of an example method 800 for transmitting SR transmissions in a first communication network during a TXOP in a second communication network, according to an embodiment. In some embodiments, the method 800 is implemented by the AP 14-1 (FIG. 1). As an example, the network interface 16 is configured to implement the method 800, according to some embodiments. For instance, the MAC processor 18 and/or the PHY processor 20 are configured to implement the method 800, according to an embodiment. In other embodiments, the method 800 is implemented by the client station 25-1. As an example, the network interface 27 is configured to implement the method 800, according to an embodiment. For instance, the MAC processor 28 and/or the PHY processor 29 are configured to implement the method 800, according to some embodiments. In other embodiments, the method 800 is implemented by another suitable communication device.

At block 804, a first communication device in the first communication network receives a control frame transmitted by a second communication device in a second communication network, wherein the control frame corresponds to establishing a TXOP that promotes spatial reuse. The control frame includes spatial reuse parameters including i) a transmit power parameter indicating a reduced transmit power level that will be used during the TXOP, and ii) a signal power threshold parameter indicating an increased signal power threshold that will be used during the TXOP, in an embodiment. In an embodiment, the control frame received at block 804 corresponds to the SR-REQ frame 504 discussed above. In another embodiment, the control frame received at block 804 corresponds to the SR-RSP frame 508 discussed above.

At block 808, first communication device determines whether the first communication device can transmit in the first network during the TXOP of the second network without causing unacceptable interference in the second network. In an embodiment, the first communication device determines whether the first communication device can transmit in the first network during the TXOP of the second network using one or both of i) the transmit power parameter, and ii) the signal power threshold parameter in the control frame. In various embodiments, the first communication device determines whether the first communication device can transmit in the first network during the TXOP of the second network without causing unacceptable interference in the second network using one or more techniques discussed above, or other suitable techniques.

At block 812, each time the first communication device determines that the first communication device can transmit in the first network during the TXOP of the second network, the first communication device performs a backoff procedure before transmitting during the TXOP. In an embodiment, block 812 includes using backoff parameters that the first communication device uses for non-SR transmissions. In another embodiment, block 812 includes using one or more backoff parameters different than backoff parameters used by the first communication device for non-SR transmissions. In an embodiment, block 812 includes transmitting at a reduced transmit power, such as using one or more techniques discussed above.

Figure 9:
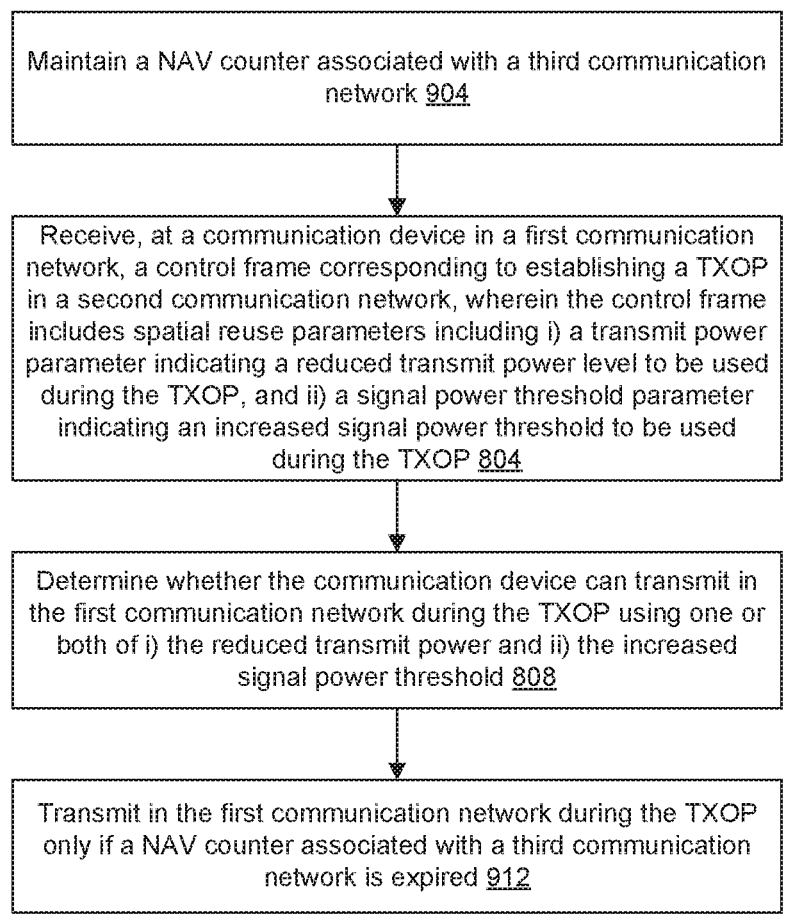
FIG. 9 is a flow diagram of another example method for transmitting spatial reuse transmissions in a first communication network during a TXOP in a second communication network, according to another embodiment.

FIG. 9 is a flow diagram of another example method 900 for transmitting SR transmissions in a first communication network during a TXOP in a second communication network, according to an embodiment. In some embodiments, the method 900 is implemented by the AP 14-1 (FIG. 1). As an example, the network interface 16 is configured to implement the method 900, according to some embodiments. For instance, the MAC processor 18 and/or the PHY processor 20 are configured to implement the method 900, according to an embodiment. In other embodiments, the method 900 is implemented by the client station 25-1. As an example, the network interface 27 is configured to implement the method 900, according to an embodiment. For instance, the MAC processor 28 and/or the PHY processor 29 are configured to implement the method 900, according to some embodiments. In other embodiments, the method 900 is implemented by another suitable communication device.

The method 900 includes like-numbered elements from the method 800 of FIG. 8, which are not discussed in detail merely for purposes of brevity.

At block 904, the first communication device maintains a NAV counter associated with a third communication network. In some embodiments, maintaining the NAV counter associated with the third communication network includes utilizing techniques such as described above with respect to FIG. 4. In other embodiments, maintaining the NAV counter associated with the third communication network includes utilizing suitable techniques different than those described above with respect to FIG. 4.

At block 912, the first communication device transmits in the first communication network during the TXOP of the second communication network only when the first communication device determines that the NAV counter associated with the third communication network has expired (e.g., equals zero). In some embodiments, when the first communication device is not maintaining any NAV counters for any third networks, block 912 is omitted.

In some embodiments, block 912 is performed prior to block 808, and block 808 is performed only when the first communication device determines that the NAV counter associated with the third communication network has expired. For example, in an embodiment, block 808 is performed responsive to the first communication device determining that the NAV counter associated with the third communication network has expired.

In an embodiment, block 912 includes transmitting at a reduced transmit power, such as using one or more techniques discussed above.

In some embodiments, the method 800 and the method 900 are combined.

Figure 10:
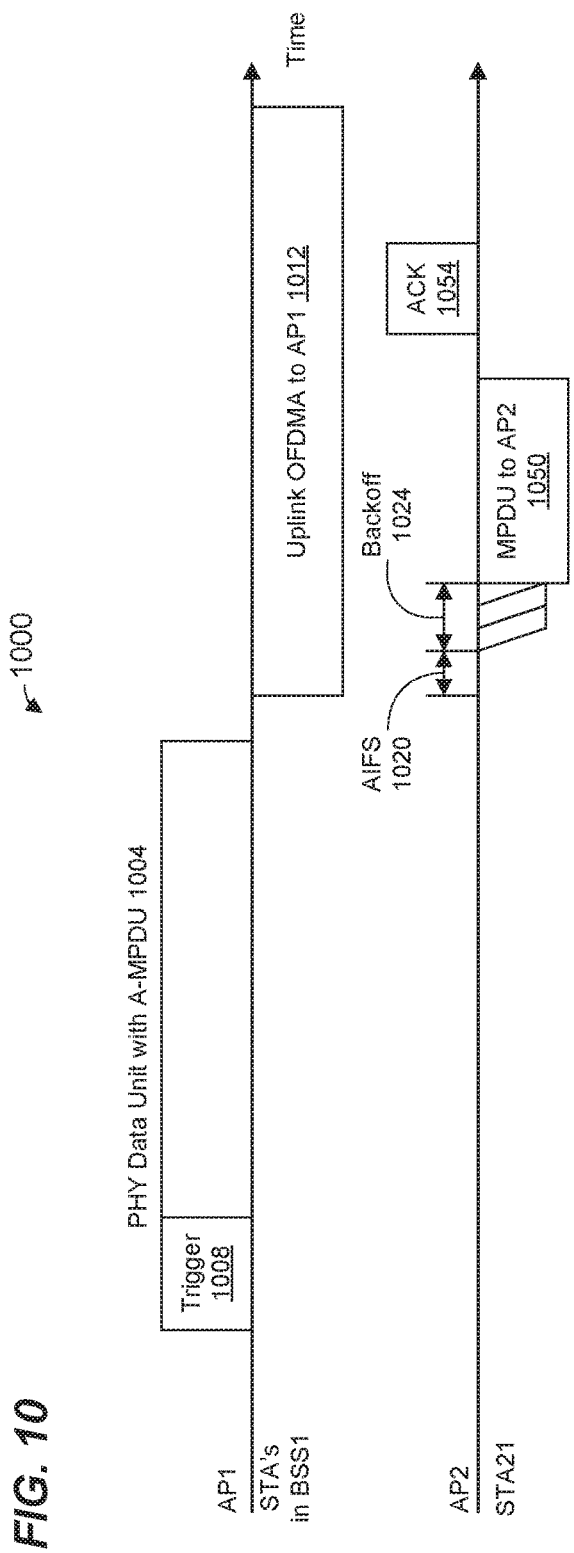
FIG. 10 is a timing diagram illustrating an example exchange of PHY data units in connection with an uplink orthogonal frequency division multiple access (UL OFDMA) transmission in a first communication network, according to an embodiment.

In some embodiments, a communication network supports uplink orthogonal frequency division multiple access (UL OFDMA) communications in which multiple client stations transmit simultaneously to an access point via respective frequency sub-bands of a communication channel. FIG. 10 is a diagram of an example UL OFDMA frame exchange 1000, according to an embodiment. A first access point (AP) transmits a PHY data unit 1004 including an aggregate MAC protocol data unit (A-MPDU). The A-MPDU includes a trigger frame 1008. The trigger frame 1008 is configured to prompt multiple client stations, which are in a first network (BSS1) served by AP1, to simultaneously transmit as part of an OFDMA transmission 1012. The client stations are configured to begin transmitting as part of an OFDMA transmission 1012 as suitable time period (e.g., SIFS, PIFS, DIFS, EIFS, etc.) after an end of the PHY data unit 1004.

Figure 11:
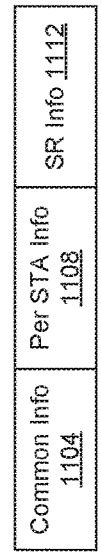
FIG. 11 is a diagram of an example frame body field included in a trigger frame illustrated in FIG. 10, according to an embodiment.

In an embodiment, the trigger frame 1008 includes a frame control field, a duration/identifier (ID) field, one or more address fields, a frame body field, and a frame check sequence (FCS) field. The trigger frame 1008 includes SR parameters to promote spatial reuse, in an embodiment. FIG. 11 is a diagram of an example frame body field 1100 included in the trigger frame 1008, according to an embodiment. The frame body field 1100 includes a common information field 1104 that includes information regarding the OFDMA transmission 1012 and that is common to all client stations that are to participate in the OFDMA transmission 1012, in an embodiment. The frame body field 1100 also includes a per station information field 1108 that includes information regarding the OFDMA transmission 1012 that is specific to respective client stations that are to participate in the OFDMA transmission 1012, in an embodiment.

In an embodiment, SR parameters such as described above are included in the common information field 1104. Additionally or alternatively, in some embodiments, the common information field 1104 includes a trigger type field that indicates that the trigger frame 1008 is a spatial reuse-type of trigger frame. For example, in an embodiment, a spatial reuse-type of trigger frame includes spatial reuse information that is not included in (e.g., omitted from) frame body fields included in a regular-type trigger frame or another type of trigger frame that is not a spatial reuse-type of trigger frame. For example, in an embodiment, a spatial reuse-type of trigger frame includes spatial reuse-related fields that are not included in (e.g., omitted from) frame body fields included in a regular-type trigger frame or another type of trigger frame that is not a spatial reuse-type of trigger frame.

In some embodiments, the frame body field 1100 includes a spatial reuse information field 1112 located after the per station information field 1108. In other embodiments, the spatial reuse information field 1112 is at another suitable location in the frame body field 1100. In an embodiment, SR parameters such as described above are included in the spatial reuse information field 1112. In some embodiments, a first set of spatial reuse information is included in the common information field 1104, whereas a second set of spatial reuse information is included in the spatial reuse information field 1112. In some embodiments, the spatial reuse information field 1112 is omitted from (e.g., not included in) the frame body field 1100, and spatial reuse information is therefore included in the common information field 1104.

Referring now to FIGS. 10 and 11, in some embodiments, STA21 analyzes SR parameters in the trigger frame 1008 to determine whether STA21 can transmit in BSS2 (e.g., served by AP2) during the uplink transmission 1012 without causing unacceptable interference in BSS1. In some embodiments, STA21 uses techniques such as described above to determine, based on the SR parameters in the trigger frame 1008, whether STA21 can transmit in BSS2 without causing unacceptable interference in BSS1.

In response to determining, based on the SR parameters in the trigger frame 1008, that STA21 can transmit in BSS2 without causing unacceptable interference in BSS1, STA21 waits for a suitable time period 1020 (e.g., AIFS, SIFS, DIFS, EIFS, etc.). Additionally, STA21 performs a backoff operation during a backoff period 1024, according to an embodiment. In response to the backoff timer expiring, STA21 transmits a PHY data unit 1050 in BSS2.

In an embodiment, STA21 is required to complete a frame exchange during the uplink transmission 1012. Thus, in some embodiments, STA21 uses information in the PHY data unit 1004 (e.g., duration information) to determine when an end of transmission of the UL OFDMA data unit 1012 will occur, and then STA21 generates the PHY data unit 1050 to ensure that transmission of the PHY data unit 1050 is completed prior to an end of the UL OFDMA data unit 1012. In some embodiments, STA21 generates the PHY data unit 1050 to ensure that transmission of the PHY data unit 1050 is completed and reception of an ACK frame 1054 is also completed prior to the end of the UL OFDMA data unit 1012.

Figure 12:
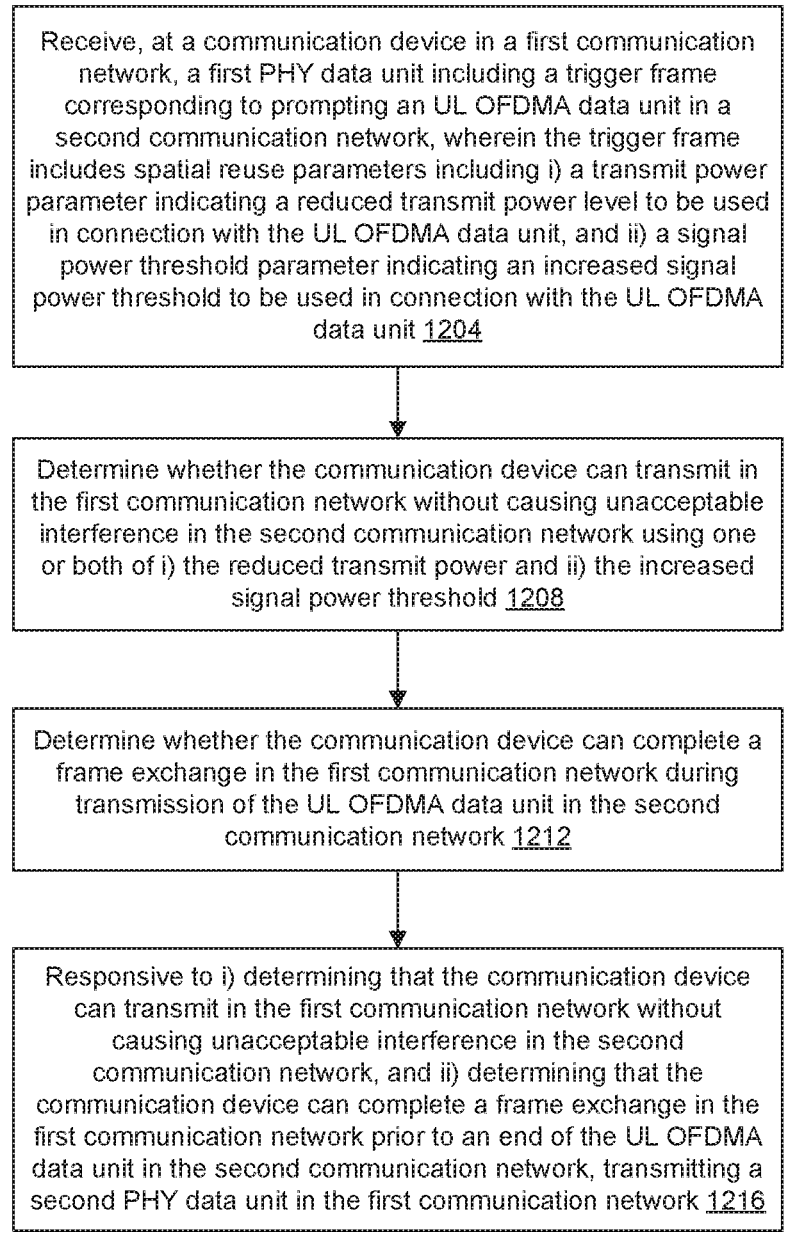
FIG. 12 is a flow diagram of an example method for transmitting spatial reuse transmissions in a first communication network during a transmission in a second communication network corresponding to an UL OFDMA transmission, according to an embodiment.

FIG. 12 is a flow diagram of an example method 1200 for transmitting SR transmissions in a first communication network during a transmission in a second communication network corresponding to an UL OFDMA transmission, according to an embodiment. In some embodiments, the method 1200 is implemented by the AP 14-1 (FIG. 1). As an example, the network interface 16 is configured to implement the method 800, according to some embodiments. For instance, the MAC processor 18 and/or the PHY processor 20 are configured to implement the method 1200, according to an embodiment. In other embodiments, the method 1200 is implemented by the client station 25-1. As an example, the network interface 27 is configured to implement the method 1200, according to an embodiment. For instance, the MAC processor 28 and/or the PHY processor 29 are configured to implement the method 1200, according to some embodiments. In other embodiments, the method 1200 is implemented by another suitable communication device.

At block 1204, a first communication device in the first communication network receives a first PHY data unit transmitted by a second communication device (e.g., an access point) in the second communication network, wherein the first PHY data unit includes a trigger frame corresponding to prompting the UL OFDMA data unit. The trigger frame includes spatial reuse parameters including i) a transmit power parameter indicating a reduced transmit power level that will be used in connection with the UL OFDMA data unit, and ii) a signal power threshold parameter indicating an increased signal power threshold that will be used connection with the UL OFDMA data unit, in an embodiment. The transmit power parameter indicates a reduced transmit power level used by the second communication device to transmit the first PHY data unit, and the signal power threshold parameter indicates an increased signal power threshold that used by the second communication device in a backoff procedure in connection with transmitting the first PHY data unit, in an embodiment. As an illustrative example, the PHY data unit received at block 1204 corresponds to the PHY data unit 1004 of FIG. 10.

At block 1208, the first communication device determines whether the first communication device can transmit in the first communication network without causing unacceptable interference in the second network in connection with the UL OFDM data unit. In an embodiment, the first communication device determines whether the first communication device can transmit in the first communication network without causing unacceptable interference in the second network during transmission of the UL OFDM data unit.

In an embodiment, the first communication device determines whether the first communication device can transmit in the first communication network using one or both of i) the transmit power parameter, and ii) the signal power threshold parameter in the trigger frame. In various embodiments, the first communication device determines whether the first communication device can transmit in the first network without causing unacceptable interference in the second network using one or more techniques discussed above, or other suitable techniques.

At block 1212, the first communication device determines whether the first communication device can complete a frame exchange in the first communication network prior to an end of transmission of the UL OFDMA data unit in the second communication network. In an embodiment, block 1212 includes using duration information in the first PHY data unit to determine when the end of transmission of the UL OFDMA data unit in the second communication network will occur.

At block 1216, the first communication device transmits a second PHY data unit in the first communication network responsive to i) determining that the first communication device can transmit in the first communication network without causing unacceptable interference in the second communication network, and ii) determining that the communication device can complete a frame exchange in the first communication network prior to the end of the UL OFDMA data unit in the second communication network. In an embodiment, block 1216 includes using one or more backoff procedures discussed above. In an embodiment, block 1216 includes transmitting at a reduced transmit power, such as using one or more techniques discussed above.

In an embodiment, a method includes: receiving, at a communication device, a signal during a backoff period of a backoff procedure, wherein the communication device is part of a first communication network; and performing, at the communication device, the backoff procedure, including: determining, at the communication device, whether i) the signal is valid, ii) the signal is from another communication network, and iii) a power level of the signal meets a threshold that a) is higher than a default threshold for the backoff procedure, and b) is for analyzing valid signals not from the first communication network, and in response to determining that i) the signal is valid, ii) the signal is from another communication network, and iii) the power level of the signal does not meet the threshold, continuing a count of a backoff timer, at the communication device, during reception of the signal, the backoff timer for measuring a backoff time period, and in connection with comparing the power level of the signal to the threshold that is higher than the default threshold, setting, at the communication device, a transmit power level to be used when the communication device transmits responsive to the backoff timer expiring to a reduced power level that is lower than a default power level. The method also includes causing the communication device to transmit at a transmit power level that is less than or equal to the reduced transmit power level in response to the backoff timer expiring as part of the backoff procedure.

In other embodiments, the method further includes one of, or any suitable combination of two or more of, the following features.

Performing the backoff procedure further includes, in response to determining that the power level of the signal meets the threshold that is higher than the default threshold: setting a network allocation vector (NAV) timer based on duration information in the signal; and stopping the backoff timer until the NAV timer expires.

The NAV timer is associated with a second communication network from which the signal originated.

Performing the backoff procedure further includes, in response to determining that the power level of the signal meets the threshold that is higher than the default threshold: raising, at the communication device, the threshold; in response to determining that the power level of the signal does not meet the raised threshold, continuing the count of the backoff timer, at the communication device, during reception of the signal; and in connection with comparing the power level of the signal to the raised threshold, setting, at the communication device, the transmit power level to be used when the communication device transmits responsive to the backoff timer expiring to a further reduced power level.

The signal is a first signal; the method further comprises receiving, at the communication device, a second signal during the backoff period after receiving the first signal; and performing the backoff procedure further includes: determining, at the communication device, whether i) the second signal is valid, ii) the second signal is from another communication network, and iii) a power level of the second signal meets the threshold that is higher than the default threshold, and in response to determining that i) the second signal is valid, ii) the second signal is from another communication network, and iii) the power level of the second signal meets the threshold, raising, at the communication device, the threshold, and in response to determining that the power level of the signal does not meet the raised threshold, continuing the count of the backoff timer, at the communication device, during reception of the second signal; and in connection with comparing the power level of the second signal to the raised threshold, setting, at the communication device, the transmit power level to be used when the communication device transmits responsive to the backoff timer expiring to a further reduced power level.

In another embodiment, an apparatus comprises a network interface device associated with a communication device that is part of a first communication network. The network interface device has one or more integrated circuits configured to: receive a signal during a backoff period of a backoff procedure; and perform the backoff procedure, including: determining whether i) the signal is valid, ii) the signal is from another communication network, and iii) a power level of the signal meets a threshold that a) is higher than a default threshold for the backoff procedure, and b) is for analyzing valid signals not from the first communication network, in response to determining that i) the signal is valid, ii) the signal is from another communication network, and iii) the power level of the signal meets the threshold, continuing a count of a backoff timer, at the communication device, during reception of the signal, the backoff timer for measuring a backoff time period, and in connection with comparing the power level of the signal to the threshold that is higher than the default threshold, setting, at the communication device, a transmit power level to be used when the communication device transmits responsive to the backoff timer expiring to a reduced power level that is lower than a default power level. The one or more integrated circuits are further configured to: in response to the backoff timer expiring as part of the backoff procedure, cause the communication device to transmit at a transmit power level that is less than or equal to the reduced transmit power level.

In other embodiments, the apparatus comprises one of, or any suitable combination of two or more of, the following features.

The one or more integrated circuits are further configured to, as part of performing the backoff procedure: in response to determining that the power level of the signal meets the threshold that is higher than the default threshold for the backoff procedure: set a network allocation vector (NAV) timer based on duration information in the signal, and stop the backoff timer until the NAV timer expires.

The one or more integrated circuits are further configured to maintain the NAV timer, which is associated with a second communication network from which the signal originated.

The one or more integrated circuits are further configured to, as part performing the backoff procedure: in response to determining that the power level of the signal meets the threshold that is higher than the default threshold: raise the threshold, in response to determining that the power level of the signal does not meet the raised threshold, continue the count of the backoff timer, at the communication device, during reception of the signal, and in connection with comparing the power level of the signal to the raised threshold, set the transmit power level to be used when the communication device transmits responsive to the backoff timer expiring to a further reduced power level.

The signal is a first signal; the one or more integrated circuits are further configured to: receive a second signal during the backoff period after receiving the first signal; and as part of performing the backoff procedure: determine whether i) the second signal is valid, ii) the second signal is from another communication network, and iii) a power level of the second signal meets the threshold that is higher than the default threshold, in response to determining that i) the second signal is valid, ii) the second signal is from another communication network, and iii) the power level of the second signal meets the threshold, raise the threshold, and in response to determining that the power level of the signal does not meet the raised threshold, continue the count of the backoff timer, at the communication device, during reception of the second signal. The one or more integrated circuits are further configured to: in connection with comparing the power level of the second signal to the raised threshold, set the transmit power level to be used when the communication device transmits responsive to the backoff timer expiring to a further reduced power level.

In yet another embodiment, a method includes: transmitting, with a communication device in a communication network, a first control frame to request a transmit opportunity period (TXOP), wherein the first control frame includes spatial reuse parameters including a transmit power parameter indicating a reduced transmit power is to be used during the TXOP, and ii) a signal power threshold parameter indicating a raised signal power threshold is to be used during the TXOP, and wherein the first control frame is transmitted at a default power level greater than the reduced transmit power to be used during the TXOP; and during the TXOP, using, at the communication device, the raised signal power threshold to as part of a backoff procedure, and transmitting, with the communication device, one or more physical layer (PHY) data units at a transmit power that is less than or equal to the reduced transmit power.

In other embodiments, the method further includes one of, or any suitable combination of two or more of, the following features.

The communication device is a first communication device; the control frame is transmitted to a second communication device; the one or more PHY data units are transmitted to the second communication device; and the method further comprises receiving, at the first communication device, a second control frame from the second communication device, wherein: the second control frame is responsive to the first control frame, the second control frame was transmitted by the second communication device at a default transmit power of the second communication device, the second control frame includes i) a transmit power parameter and ii) a signal power threshold parameter, and the second control frame confirms the TXOP.

During the TXOP, the first communication device can transmit PHY data units only to the second communication device; and during the TXOP, only the second communication device can transmit PHY data units to the first communication device.

In still another embodiment, an apparatus comprises a network interface device associated with a communication device that is part of a first communication network. The network interface device has one or more integrated circuits configured to: transmit a first control frame to request a transmit opportunity period (TXOP), wherein the first control frame includes spatial reuse parameters including a transmit power parameter indicating a reduced transmit power is to be used during the TXOP, and ii) a signal power threshold parameter indicating a raised signal power threshold is to be used during the TXOP, and wherein the first control frame is transmitted at a default power level greater than the reduced transmit power to be used during the TXOP. The one or more integrated circuits are also configured to, during the TXOP: use the raised signal power threshold to as part of a backoff procedure, and transmit one or more physical layer (PHY) data units at a transmit power that is less than or equal to the reduced transmit power.

In other embodiments, the apparatus comprises one of, or any suitable combination of two or more of, the following features.

The communication device is a first communication device; the control frame is transmitted to a second communication device; the one or more PHY data units are transmitted to the second communication device; and the one or more integrated circuits configured to receive a second control frame from the second communication device, wherein the second control frame is responsive to the first control frame, the second control frame was transmitted by the second communication device at a default transmit power of the second communication device, the second control frame includes i) a transmit power parameter and ii) a signal power threshold parameter, and the second control frame confirms the TXOP.

During the TXOP, the first communication device can transmit PHY data units only to the second communication device; and during the TXOP, only the second communication device can transmit PHY data units to the first communication device.

In yet another embodiment, a method includes: receiving, at a communication device in a first communication network, a control frame transmitted in a second communication network and signaling a transmit opportunity period (TXOP) in the second communication network, wherein the control frame includes spatial reuse parameters comprising a transmit power parameter indicating a reduced transmit power is to be used during the TXOP; determining, at the communication device and using the transmit power parameter in the control frame, whether the communication device can transmit in the first communication network during the TXOP; and at least one of: i) when the communication device determines that the communication device can transmit in the first communication network during the TXOP, performing, at the communication device, a backoff procedure before transmitting any physical layer (PHY) data units in the first communication network during the TXOP, or ii) transmitting any PHY data units in the first communication network during the TXOP only when a network allocation vector (NAV) counter associated with a third communication network has expired.

In other embodiments, the method further includes one of, or any suitable combination of two or more of, the following features.

The method also include performing, at the communication device, the backoff procedure before transmitting any PHY data units in the first communication network during the TXOP, wherein performing the backoff procedure comprises: using, at the communication device, a first set of backoff parameters for the backoff procedure during the TXOP, wherein the first set of backoff parameters is associated with spatial reuse and is different than a second set of backoff parameters corresponding to a non-spatial reuse backoff procedure; and after the TXOP, using, at the communication device, the second set of backoff parameters during a backoff procedure not associated with spatial reuse.

The method also includes transmitting during the TXOP only when a) the communication device determines that the communication device can transmit in the first communication network during the TXOP, and b) the NAV counter associated with a third communication network has already expired when the TXOP begins.

In another embodiment, an apparatus comprises a network interface device associated with a communication device that is part of a first communication network. The network interface device has one or more integrated circuits configured to: receive a control frame transmitted in a second communication network and signaling a transmit opportunity period (TXOP) in the second communication network, wherein the control frame includes spatial reuse parameters comprising a transmit power parameter indicating a reduced transmit power is to be used during the TXOP; determine, using the transmit power parameter in the control frame, whether the communication device can transmit in the first communication network during the TXOP; and at least one of: i) when the communication device determines that the communication device can transmit in the first communication network during the TXOP, perform a backoff procedure before transmitting any physical layer (PHY)

data units in the first communication network during the TXOP, or ii) cause the first communication device to transmit any PHY data units during the TXOP only when a network allocation vector (NAV) counter associated with a third communication network has expired.

In other embodiments, the apparatus comprises one of, or any suitable combination of two or more of, the following features.

The one or more integrated circuits are configured to: perform the backoff procedure before transmitting any PHY data units in the first communication network during the TXOP. Performing the backoff procedure includes: using a first set of backoff parameters for the backoff procedure during the TXOP, wherein the first set of backoff parameters is associated with spatial reuse and is different than a second set of backoff parameters corresponding to a non-spatial reuse backoff procedure, and after the TXOP, using, at the communication device, the second set of backoff parameters during a backoff procedure not associated with spatial reuse.

The one or more integrated circuits are configured to: cause the first communication device to transmit during the TXOP only when a) the communication device determines that the communication device can transmit in the first communication network during the TXOP, and b) the NAV counter associated with a third communication network has already expired when the TXOP begins.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on a computer readable medium, or media, such as a magnetic disk, an optical disk, a random access memory (RAM), a read only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of i) discrete components, ii) one or more integrated circuits, iii) one or more ASICs, iv) one or more programmable logic devices, etc.

While the present disclosure has been described with reference to specific examples, which are intended to be illustrative only and not to be limiting of the invention, changes, additions and/or deletions may be made to the disclosed embodiments without departing from the scope of the claims.

What is claimed is:

1. A method, comprising:
    receiving, at a communication device, a signal during a backoff period of a backoff procedure, wherein the communication device is part of a first communication network;
    performing, at the communication device, the backoff procedure, including:
        determining, at the communication device, whether i) the signal is valid, ii) the signal is from another communication network, and iii) a power level of the signal meets a threshold that a) is higher than a default threshold for the backoff procedure, and b) is for analyzing valid signals not from the first communication network,
        in response to determining that i) the signal is valid, ii) the signal is from another communication network, and iii) the power level of the signal does not meet the threshold, continuing a count of a backoff timer, at the communication device, during reception of the signal, the backoff timer for measuring a backoff time period, and
        in connection with comparing the power level of the signal to the threshold that is higher than the default threshold, setting, at the communication device, a transmit power level to be used when the communication device transmits responsive to the backoff timer expiring to a reduced transmit power level that is (i) lower than a default transmit power level and (ii) based on a spatial reuse parameter included in the received signal, the spatial reuse parameter indicating a reduced transmit power is to be used during a transmit opportunity period (TXOP) associated with a second communication network from which the signal originated; and
    in response to the backoff timer expiring as part of the backoff procedure, causing the communication device to transmit at a transmit power level that is less than or equal to the reduced transmit power level.

2. The method of claim 1, wherein performing the backoff procedure further includes, in response to determining that the power level of the signal meets the threshold that is higher than the default threshold:
    setting a network allocation vector (NAV) timer based on duration information in the signal; and
    stopping the backoff timer until the NAV timer expires.

3. The method of claim 2, wherein the NAV timer is associated with the second communication network from which the signal originated.

4. The method of claim 1, wherein performing the backoff procedure further includes, in response to determining that the power level of the signal meets the threshold that is higher than the default threshold:
    raising, at the communication device, the threshold;
    in response to determining that the power level of the signal does not meet the raised threshold, continuing the count of the backoff timer, at the communication device, during reception of the signal; and
    in connection with comparing the power level of the signal to the raised threshold, setting, at the communication device, the transmit power level to be used when the communication device transmits responsive to the backoff timer expiring to a further reduced transmit power level.

5. The method of claim 1, wherein:
    the signal is a first signal;
    the method further comprises receiving, at the communication device, a second signal during the backoff period after receiving the first signal; and
    performing the backoff procedure further includes:
        determining, at the communication device, whether i) the second signal is valid, ii) the second signal is from another communication network, and iii) a power level of the second signal meets the threshold that is higher than the default threshold,
        in response to determining that i) the second signal is valid, ii) the second signal is from another communication network, and iii) the power level of the second signal meets the threshold,
        raising, at the communication device, the threshold, and
        in response to determining that the power level of the signal does not meet the raised threshold, continuing the count of the backoff timer, at the communication device, during reception of the second signal; and in connection with comparing the power level of the second signal to the raised threshold, setting, at the communication device, the transmit power level to be used when the communication device transmits responsive to the backoff timer expiring to a further reduced transmit power level.

6. An apparatus, comprising:

a network interface device associated with a communication device that is part of a first communication network, the network interface device having one or more integrated circuits configured to:

receive a signal during a backoff period of a backoff procedure, perform the backoff procedure, including:

determining whether i) the signal is valid, ii) the signal is from another communication network, and iii) a power level of the signal meets a threshold that a) is higher than a default threshold for the backoff procedure, and b) is for analyzing valid signals not from the first communication network, in response to determining that i) the signal is valid, ii) the signal is from another communication network, and iii) the power level of the signal meets the threshold, continuing a count of a backoff timer, at the communication device, during reception of the signal, the backoff timer for measuring a backoff time period, and in connection with comparing the power level of the signal to the threshold that is higher than the default threshold, setting, at the communication device, a transmit power level to be used when the communication device transmits responsive to the backoff timer expiring to a reduced transmit power level that is (i) lower than a default transmit power level and (ii) based on a spatial reuse parameter included in the received signal, the spatial reuse parameter indicating a reduced transmit power is to be used during a transmit opportunity period (TXOP) associated with a second communication network from which the signal originated; and wherein the one or more integrated circuits are further configured to:

in response to the backoff timer expiring as part of the backoff procedure, cause the communication device to transmit at a transmit power level that is less than or equal to the reduced transmit power level.

7. The apparatus of claim 6, wherein the one or more integrated circuits are further configured to, as part of performing the backoff procedure:

in response to determining that the power level of the signal meets the threshold that is higher than the default threshold for the backoff procedure:

set a network allocation vector (NAV) timer based on duration information in the signal, and stop the backoff timer until the NAV timer expires.

8. The apparatus of claim 7, wherein the one or more integrated circuits are further configured to maintain the NAV timer, which is associated with the second communication network from which the signal originated.

9. The apparatus of claim 6, wherein the one or more integrated circuits are further configured to, as part performing the backoff procedure:

in response to determining that the power level of the signal meets the threshold that is higher than the default threshold:

raise the threshold, in response to determining that the power level of the signal does not meet the raised threshold, continue the count of the backoff timer, at the communication device, during reception of the signal, and in connection with comparing the power level of the signal to the raised threshold, set the transmit power level to be used when the communication device transmits responsive to the backoff timer expiring to a further reduced transmit power level.

10. The apparatus of claim 6, wherein:

the signal is a first signal;

the one or more integrated circuits are further configured to:

receive a second signal during the backoff period after receiving the first signal; and as part of performing the backoff procedure:

determine whether i) the second signal is valid, ii) the second signal is from another communication network, and iii) a power level of the second signal meets the threshold that is higher than the default threshold, and in response to determining that i) the second signal is valid, ii) the second signal is from another communication network, and iii) the power level of the second signal meets the threshold, raise the threshold, in response to determining that the power level of the signal does not meet the raised threshold, continue the count of the backoff timer, at the communication device, during reception of the second signal; and the one or more integrated circuits are further configured to:

in connection with comparing the power level of the second signal to the raised threshold, set the transmit power level to be used when the communication device transmits responsive to the backoff timer expiring to a further reduced transmit power level.

11. A method, comprising:

transmitting, with a communication device in a communication network, a first control frame to request a transmit opportunity period (TXOP), wherein the first control frame includes spatial reuse parameters including i) a transmit power parameter indicating a reduced transmit power is to be used during the TXOP, and ii) a signal power threshold parameter indicating a raised signal power threshold is to be used during the TXOP, and wherein the first control frame is transmitted at a default power level greater than the reduced transmit power to be used during the TXOP; and during the TXOP, using, at the communication device, the raised signal power threshold as part of a backoff procedure, and transmitting, with the communication device, one or more physical layer (PHY) data units at a transmit power that is less than or equal to the reduced transmit power.

12. The method of claim 11, wherein:

the communication device is a first communication device;

the control frame is transmitted to a second communication device;

the one or more PHY data units are transmitted to the second communication device; and the method further comprises receiving, at the first communication device, a second control frame from the second communication device, wherein
the second control frame is responsive to the first control frame,
the second control frame was transmitted by the second communication device at a default transmit power of the second communication device,
the second control frame includes i) a transmit power parameter and ii) a signal power threshold parameter, and
the second control frame confirms the TXOP.

13. The method of claim 12, wherein:
during the TXOP, the first communication device can transmit PHY data units only to the second communication device; and
during the TXOP, only the second communication device can transmit PHY data units to the first communication device.

14. An apparatus, comprising:
a network interface device associated with a communication device that is part of a first communication network, the network interface device having one or more integrated circuits configured to:
transmit a first control frame to request a transmit opportunity period (TXOP), wherein the first control frame includes spatial reuse parameters including i) a transmit power parameter indicating a reduced transmit power is to be used during the TXOP, and ii) a signal power threshold parameter indicating a raised signal power threshold is to be used during the TXOP, and wherein the first control frame is transmitted at a default power level greater than the reduced transmit power to be used during the TXOP, and
during the TXOP,
use the raised signal power threshold to as part of a backoff procedure, and
transmit one or more physical layer (PHY) data units at a transmit power that is less than or equal to the reduced transmit power.

15. The apparatus of claim 14, wherein:
the communication device is a first communication device;
the control frame is transmitted to a second communication device;
the one or more PHY data units are transmitted to the second communication device; and
the one or more integrated circuits configured to receive a second control frame from the second communication device, wherein
the second control frame is responsive to the first control frame,
the second control frame was transmitted by the second communication device at a default transmit power of the second communication device,
the second control frame includes i) a transmit power parameter and ii) a signal power threshold parameter, and
the second control frame confirms the TXOP.

16. The apparatus of claim 15, wherein:
during the TXOP, the first communication device can transmit PHY data units only to the second communication device; and
during the TXOP, only the second communication device can transmit PHY data units to the first communication device.

17. A method, comprising:
receiving, at a communication device in a first communication network, a control frame transmitted in a second communication network and signaling a transmit opportunity period (TXOP) in the second communication network, wherein the control frame includes spatial reuse parameters comprising a transmit power parameter indicating a reduced transmit power is to be used during the TXOP;
determining, at the communication device and using the transmit power parameter in the control frame, whether the communication device can transmit in the first communication network during the TXOP; and
at least one of:
i) when the communication device determines that the communication device can transmit in the first communication network during the TXOP, performing, at the communication device, a backoff procedure before transmitting any physical layer (PHY) data units in the first communication network during the TXOP, or
ii) transmitting any PHY data units in the first communication network during the TXOP only when a network allocation vector (NAV) counter associated with a third communication network has expired.

18. The method of claim 17, comprising:
performing, at the communication device, the backoff procedure before transmitting any PHY data units in the first communication network during the TXOP, wherein performing the backoff procedure comprises:
using, at the communication device, a first set of backoff parameters for the backoff procedure during the TXOP, wherein the first set of backoff parameters is associated with spatial reuse and is different than a second set of backoff parameters corresponding to a non-spatial reuse backoff procedure; and
after the TXOP, using, at the communication device, the second set of backoff parameters during a backoff procedure not associated with spatial reuse.

19. The method of claim 17, comprising:
transmitting during the TXOP only when a) the communication device determines that the communication device can transmit in the first communication network during the TXOP, and b) the NAV counter associated with a third communication network has already expired when the TXOP begins.

20. An apparatus, comprising:
a network interface device associated with a communication device that is part of a first communication network, the network interface device having one or more integrated circuits configured to:
receive a control frame transmitted in a second communication network and signaling a transmit opportunity period (TXOP) in the second communication network, wherein the control frame includes spatial reuse parameters comprising a transmit power parameter indicating a reduced transmit power is to be used during the TXOP,
determine, using the transmit power parameter in the control frame, whether the communication device can transmit in the first communication network during the TXOP, and
at least one of:

i) when the communication device determines that the communication device can transmit in the first communication network during the TXOP, perform a backoff procedure before transmitting any physical layer (PHY) data units in the first communication network during the TXOP, or ii) cause the first communication device to transmit any PHY data units during the TXOP only when a network allocation vector (NAV) counter associated with a third communication network has expired.

21. The apparatus of claim 20, wherein the one or more integrated circuits are configured to:

perform the backoff procedure before transmitting any PHY data units in the first communication network during the TXOP, wherein performing the backoff procedure includes:

using a first set of backoff parameters for the backoff procedure during the TXOP, wherein the first set of backoff parameters is associated with spatial reuse and is different than a second set of backoff parameters corresponding to a non-spatial reuse backoff procedure, and after the TXOP, using, at the communication device, the second set of backoff parameters during a backoff procedure not associated with spatial reuse.

22. The apparatus of claim 20, wherein the one or more integrated circuits are configured to:

cause the first communication device to transmit during the TXOP only when a) the communication device determines that the communication device can transmit in the first communication network during the TXOP, and b) the NAV counter associated with a third communication network has already expired when the TXOP begins.

* * * * *